(12) United States Patent
Boaretto et al.

(10) Patent No.: US 11,827,278 B2
(45) Date of Patent: Nov. 28, 2023

(54) SUPPORTING ROD OF VEHICLE COMPONENT, SYSTEM OF INTEGRATING SUPPORT AND VIBRATIONAL DAMPING AND PROCESS FOR MANUFACTURING OF A SUPPORTING ROD OF VEHICLE COMPONENT

(71) Applicant: Fras-le S.A., Farroupilha (BR)

(72) Inventors: Joel Boaretto, Caxias do Sul (BR); Cesar Augusto Cardoso Teixeira de Albuquerque Ferreira, Caxias do Sul (BR); Eduardo Tende, Caxias do Sul (BR); Gabriel Dick, Novo Hamburgo (BR); Robinson Carlos Dudley Cruz, Caxias do Sul (BR)

(73) Assignee: Fras-le S.A., Rio Grande do Sul (BR)

( * ) Notice: Subject to any disclaimer, the term of this patent is extended or adjusted under 35 U.S.C. 154(b) by 13 days.

(21) Appl. No.: 17/492,858

(22) Filed: Oct. 4, 2021

(65) Prior Publication Data
US 2022/0105990 A1    Apr. 7, 2022

(30) Foreign Application Priority Data
Oct. 5, 2020   (BR) .......................... 102020020456-4

(51) Int. Cl.
*B62D 25/16*   (2006.01)
*B29C 48/06*   (2019.01)
(Continued)

(52) U.S. Cl.
CPC ............ *B62D 25/166* (2013.01); *B29C 48/06* (2019.02); *B29C 70/003* (2021.05);
(Continued)

(58) Field of Classification Search
CPC ...... B62D 25/166; B62D 25/16; B29C 48/06; B29C 70/003; B29C 70/446; B29C 70/521; B29L 2031/001; B29L 2031/3005
(Continued)

(56) References Cited

U.S. PATENT DOCUMENTS

| | | | |
|---|---|---|---|
| 11,453,182 B2 * | 9/2022 | Zhao ..................... | B32B 19/045 |
| 2005/0089707 A1 * | 4/2005 | Obeshaw ................. | B32B 3/28 |
| | | | 428/615 |

(Continued)

FOREIGN PATENT DOCUMENTS

| | | |
|---|---|---|
| BR | 102015014506-3 A2 | 12/2016 |
| CN | 107867336 A * | 4/2018 |

(Continued)

*Primary Examiner* — James A Shriver, II
*Assistant Examiner* — Hilary L Johns
(74) *Attorney, Agent, or Firm* — Laurence P. Colton; SMITH TEMPEL BLAHA LLC

(57) ABSTRACT

A multifunctional supporting rod of vehicle components of commercial vehicles, such as road implements, including, e.g., rods useful in supporting of vehicle components like fender, wings, rearview mirrors, lighting devices for commercial vehicles and similar, among other parts. In one aspect, the rod includes an integrated shock absorber for vibrational efforts and load in rod itself, comprising structural composite material, which provides improved dampen of mechanic-dynamic efforts and improved mechanic responses, reducing structural fatigue. In other aspect, the rod provides higher resistance to efforts, less material amount, and provides a mode of incomplete failure in predetermined location, avoiding loss of components during a structural failure generated from use. In another aspect, the rod has low weight/mass, provides gain of payload of commercial vehicle, and economy of energy/fuel.

5 Claims, 30 Drawing Sheets

(51) Int. Cl.
  *B29C 70/00* (2006.01)
  *B29C 70/44* (2006.01)
  *B29C 70/52* (2006.01)
  *B29L 31/00* (2006.01)
  *B29L 31/30* (2006.01)

(52) U.S. Cl.
  CPC .......... *B29C 70/446* (2013.01); *B29C 70/521* (2013.01); *B29L 2031/001* (2013.01); *B29L 2031/3005* (2013.01)

(58) Field of Classification Search
  USPC ........................................................ 180/184
  See application file for complete search history.

(56) References Cited

U.S. PATENT DOCUMENTS

| | | | | |
|---|---|---|---|---|
| 2009/0256345 | A1* | 10/2009 | Tanaka | B62D 25/161 264/238 |
| 2021/0170701 | A1* | 6/2021 | Zhao | B32B 27/12 |
| 2021/0276299 | A1* | 9/2021 | Baumann | B29C 44/12 |
| 2022/0105704 | A1* | 4/2022 | Migdal | B32B 3/30 |

FOREIGN PATENT DOCUMENTS

| | | | | |
|---|---|---|---|---|
| DE | 19626272 | A1 | | 1/1998 |
| DE | 19810252 | A1 * | 9/1999 | ........... B62D 25/168 |
| DE | 102006061616 | A1 | | 7/2008 |
| JP | 2009274711 | A | | 11/2009 |

\* cited by examiner

SUPPORTING ROD OF VEHICLE COMPONENT, SYSTEM OF INTEGRATING SUPPORT AND VIBRATIONAL DAMPING AND PROCESS FOR MANUFACTURING OF A SUPPORTING ROD OF VEHICLE COMPONENT

CROSS REFERENCE TO RELATED APPLICATIONS

This application claims the benefit of and convention priority on Brazil Patent Application No. BR 10 2020 020456.4 having a filing date of 5 Oct. 2020.

BACKGROUND OF THE INVENTION

Field of the Invention

The present invention pertains to fields of mechanical engineering, materials engineering, structural composites, commercial vehicles, and road implements. More specifically, the invention provides a technical solution for improving the performance relative to vibrational and load stress of supporting rods or vehicle component supports of commercial vehicles, such as road implements, avoiding the need of rubber rings. In one aspect, the invention provides an improved and multifunctional supporting rod of vehicle components of commercial vehicles, such as road implements, including, e.g., rods useful in supporting of vehicle components like fender, wings, rearview mirrors, lighting devices for commercial vehicles and similar, among other vehicle components. In one aspect, the rod of the invention comprises an integrated shock absorber for vibrational efforts and load in rod itself, comprising structural composite material, which provides improved dampen of mechanic-dynamic efforts and improved mechanic responses, reducing structural fatigue. In another aspect, the rod of the present invention provides higher resistance to efforts, less amount of material, and provides a mode of incomplete failure in predetermined location, avoiding loss of components during a structural failure generated from use. In another aspect, the rod of the invention has low weight/mass, provides gain of payload of commercial vehicle, economy of energy/fuel.

Prior Art

Supporting rods are used in commercial vehicles, such as trailers with road implements, trucks and buses, to promote anchoring of vehicle components like fender to vehicle chassis. The prior art uses supporting rods of metallic material. Metallic materials are widely used in commercial vehicles due to its mechanical proprieties, but its use in supporting rods of vehicle components in general, such as fenders, results in several technical problems like corrosion, since the part is exposed to environmental changes, such rain and mud. In addition, the manufacturing of metal rods is expensive and metal rods are subject to failures in welds associated to heat input in the welding process. Further, metal parts present considerable self-weight and its use is subject to a variant set of failures and/or accidents. Moreover, rods of the prior art need the use of a rubber ring at the rod and vehicle linkage, in order to promote damping in vibration generated from the vehicle use, it demands a higher number of parts and consequently increases parts subjected to failure or the requirement for maintenance. The present invention solves these problems.

The supporting rods in metallic material generally have tubular geometries, either square or circular, or even have "half-cane" geometries, whose cross-section presents a "C" geometry, with the concavity facing downwards. The use of metallic materials for rods entails shape/geometry limitations. For example, steel rods have constructive limitations both in their design and in their manufacture as negative points, considering that optimized geometric shapes require sophisticated technologies and large investments in tooling and/or the addition of parts to form the set. Thus, the use of metallic rods is expensive, requires specialized labor and requires joining and finishing processes that give rise to fragile points. In addition, the structure of the metallic rod itself brings disadvantages as it requires sanding and painting in the finish, welding steps, the possibility of deformation in the part, requiring labor operating in an unhealthy condition and expensive equipment. The present invention solves these problems.

There are also other consequences of using steel in the manufacture of commercial vehicle rods, such as the ergonomics for the operator who makes the assembly or maintenance of the part, since there is a considerable mass of the component. The present invention solves this problem.

A crucial point regarding the use of metallic rods is the issue of failures. When a failure occurs during use, for instance due to fatigue, this failure can be catastrophic, i.e., the metallic part can break at some point in its length without prior warning, with an increase in the range of motion. The broken part and the vehicle components attached to it (fender, mud cover, rear view mirror, traffic light, as well as their fastening elements) may fall onto the road without control, causing serious accidents in addition to material damage and non-compliance with traffic rules. The present invention solves these problems.

In the search for the prior art in scientific and patent literature, the following documents were found dealing with the subject:

BR 102015014506-3 presents a half-cane rod with perpendicular structural reinforcements in its cavity, so that its cross section can be understood as varying between a "C" profile and a "D" profile. The document presents a metallic supporting rod with a common geometry of the technique, which diverges significantly from the present invention, in addition to not providing any solution that prevents the part from falling if the rod breaks and requires the use of rod association rubber rings with the vehicle to dampen vibration.

DE19626272A1 and JP2009274711A disclose fenders made of composite material. These documents do not present any solution related to the supporting rod of vehicle components, only the body of a fender itself, which are already manufactured in polymers in a way that is widely spread in the art, and do not reveal any solution that allows to prevent the fall of the part on the road if it breaks.

DE102006061616A1 presents vehicle fairing components such as bumpers, fender, wings, etc. made of composite material that have a predetermined point of failure. Said point of failure is made in the form of a chamfer on the component and aims to promote the component's breakage in the chamfer region in case of shocks and impacts. The aforementioned document does not present any solution to prevent the part from falling on the road in case of breakage and does not anticipate the rod of the present invention.

Thus, from what appears from the researched literature, no documents were found anticipating or suggesting the teachings of the present invention, so that, to the best knowledge of the inventors, the solution proposed herein has novelty and inventive activity against of the prior art.

Accordingly, there were no prior documents that present or suggest a solution that provides concomitantly: elimination of the need for rubber rings to dampen the vibration; the mass reduction of the supporting rod of commercial vehicles; the use of composites that withstand the severe mechanical requirements to which commercial vehicles such as road implements are subjected; choosing the location and mode of incomplete failure on the rod, to avoid material losses and prevent parts from falling on the road in case of breakage; the reduction of vehicle fuel/energy consumption.

BRIEF SUMMARY OF THE INVENTION

The present invention solves the problems of the prior art from a technical solution for improving the performance against to vibrational efforts and load of supporting rods or support of vehicle components of commercial vehicles.

In one aspect, the invention provides an improved and multifunctional supporting rod of vehicle components of commercial vehicles such as the road implements, including, e.g., rods useful to support fender and traffic lights, among other components.

In one aspect, the rod of the invention comprises an integrated shock absorber for vibrational efforts and load on the rod itself that provides improved dampen of mechanical-dynamic efforts and improved mechanical responses, reducing structural fatigue, and eliminating the need for additional parts such as rubber rings when attaching the rod to the vehicle.

In one aspect, the rod of the invention comprises structural composite material and is characterized as being "no black metal", i.e., its design does not consist of the mere replacement of metal by composite, and it does reduce the amount of material and provides an improved performance against to vibration, load, fatigue, corrosion.

In another aspect, the rod of the invention provides a failure mode at a predetermined location, so that if the rod fails, resulting from the fatigue of its prolonged use or misuse by a user, the loss of components during a structural failure during use is avoided.

In another aspect, the rod of the invention provides advantages in installation and maintenance, as it is much lighter than the metallic counterparts (approx. 64%), has improved dimensional accuracy and does not have the problem of pre-tensioning, which detracts from the performance of metallic rods and anticipates the occurrence of future failures.

In another aspect, the rod of the invention has low weight/mass, provides commercial vehicle payload gain, improved logistics in large quantities and fuel economy. Furthermore, it provides a reduction in the emission of pollutants, configuring one of the environmental and sustainable characteristics of the present invention, which is considered a green technology.

In an embodiment, the elastic modulus for bending force of the rod of the invention material varies in a range from 5 GPa to 50 GPa. In an embodiment, the elastic modulus for tension force of the material of rod of the invention material varies in a range from 5 GPa to 50 GPa.

In an embodiment, the loss or damping factor of the material of the present invention varies in a range from 0.01 to 0.35, contributing to the energy dissipation of the present invention, aiding in its damping feature.

One of the objects of the present invention is a system of integrating support and vibrational damping of vehicle components for commercial vehicles. Said system comprises a composite material supporting rod that comprises a base or region of association of the supporting rod to the vehicle; and an extended region in which a vehicle component is associated with said supporting rod, wherein the width of the base being greater than the width of the remainder of the supporting rod. In an embodiment, the base of the supporting rod comprises one or more projections at an angle to the axial shaft of the rod, forming one or more French-hand structures integrated into the base itself. In an embodiment, the rod of the invention comprises predefined failure region to provide localized and incomplete rupture in a rod failure situation.

An object of the present invention is a process for manufacturing a supporting rod of vehicle components for commercial vehicles comprising the steps of:

mixing at least one fiber with at least one resin, wherein said fiber corresponding to a range of 20% to 85% by mass of the mixing;

inserting the at least one fiber with at least one resin mixture into a supporting rod mold;

supplying heat to the supporting rod mold and/or to the at least one fiber with at least one resin mixture, and then pressing the mixture into the mold, curing the resin, and demolding the supporting rod.

In an embodiment of said process, the resin is selected from: polyolefin resins in general such as polyester, epoxy, polyacrylate, polypropylene, polyurethane, nylon, polyamide, benzoxazines; as well as resins of vegetable origin, such as cellulose and starch, such as plasticized and modified starches, nanocellulose, among others.

In an embodiment of said process, the long fiber is selected from: glass fibers (E-glass, S-glass, C-glass, R-glass or T-glass), carbon fiber, aramid fiber, basalt fiber, PBO (Zylon), PAN, Boron fibers, UHMW-PE fibers, PP fibers, quartz fibers, ceramic fibers, hybrid fibers (e.g., carbon/aramid), as well as fibers of plant origin such as cotton, cannabis, poppy, hemp, abaca, bamboo, coconut, flax, jute, kenaf, sisal, and similar.

In an embodiment, in addition to fibers, the present invention further comprises organic and inorganic nano and micro particles as reinforcement and/or filler of polymer matrices.

Fibers are used with different length possibilities. In an embodiment, long fiber corresponds to a range of 20% to 85% by mass of the mixture. In an embodiment, the long fiber corresponds to 35% by mass. In an embodiment of said process, the mold and/or the mixture are heated to a temperature between 100° C. and 300° C.

It is an object of the present invention a commercial vehicle with at least one vehicle component that comprises at least one supporting rod of vehicle components comprising:

at least one combination of cured resin and long fiber, wherein said long fiber corresponds to a range of 20% to 85% by mass of the rod; and/or a vehicle association damping base; an extension extending from the base, wherein the width of the base is greater than the width of the extension (30).

These and other objects of the invention will be immediately appreciated by those skilled in the art and will be described in detail below.

DETAILED DESCRIPTION OF PREFERRED EMBODIMENTS

Figure 1:
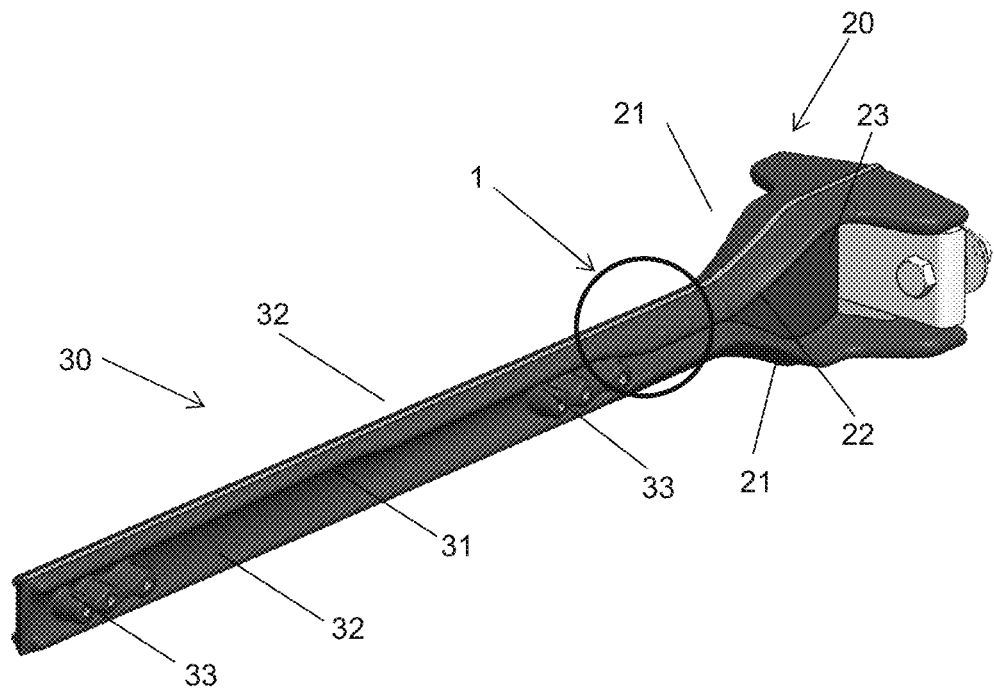
FIG. 1 shows a perspective view of an embodiment of the supporting rod of the present invention intended for large vehicles.
Figure 2:
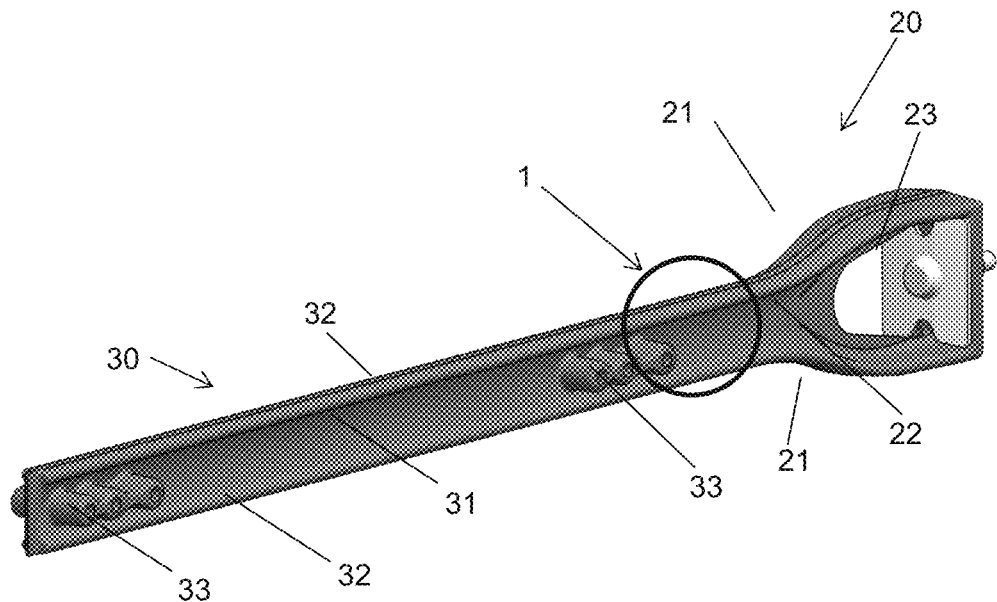
FIG. 2 shows a perspective view of an embodiment of the supporting rod of the present invention intended for smaller vehicles.

The following descriptions are presented by way of example and do not limit the scope of the invention and will make the object of this patent application more clearly understood.

The supporting rod of the invention comprises structural reinforcements in regions of greater structural demand, the other regions of the rod having greater freedom of choice of shape. The rod of the invention has mass reduction and provides a commercial vehicle with greater payload capacity, reduced fuel consumption and pollutant emission, configuring one of the environmental and sustainable characteristics of the present invention. The rod of the invention has improved durability and failure mode prediction, which gives you the choice of the region where a failure can occur and, if it does, prevents the rod from completely breaking into two or more parts, preventing the vehicle from falling component on the roads and preventing accidents.

The process for obtaining the rod eliminates the need to join components and use special tools, in addition to not requiring specialized labor or operating in unsanitary conditions. In addition, the rod assembly process provides several advantages, including improved ergonomics when assembling the part and reduced risk of accidents or operational hazards.

In an embodiment, as a result of prolonged use (fatigue) or misuse (load in excess caused unduly by the user), the supporting rod of the present invention was designed in such way that, in the event of a failure, it occurs at a point where it does not generate the loss of the vehicle component; the failure occurs incompletely at a point designed to do so. This technical feature of the present invention is very suitable, since the projected failure mode provides the revelation of the structural situation of the component, by increasing the range of motion, which provides the characteristic of predictive failure. Furthermore, in the event of a failure, it occurs incompletely at a point where it does not cause loss of the part and other components attached to it. Therefore, the base, which is the part associated with the chassis, and the region of the rod to the first anchor point of the part (a fender, for example) is always intact, giving the vehicle user the option of going to a replacement location without losing the component on the road. The freedom of form provided by the invention allows the interchangeability of the rod of the invention with the products of the prior art, allowing the readily replacement of available metallic parts in use on the market. Furthermore, the design of the present invention is designed in order to provide its own damping system, generated by the synergy of the properties of the raw material and the geometry of the component itself, thus allowing to eliminate the use of rubber rings when attaching the rod to the vehicle for damping, since the rod body itself acts as a damper of vehicle use vibrations.

In an embodiment, the failure mode is predefined from a failure region 1 in the support rod of the invention. In an embodiment, the failure region 1 is a stress concentration region of the rod of the invention. In an embodiment, the stress concentration region is given by the dimensional variation of the section of the rod of the invention. In an embodiment, in a non-exclusive way, the failure region 1 of the rod of the invention is a region with a smaller amount of long fiber and/or amount of resin than in the rest of the rod.

In commercial vehicle chassis, such as trailers, to support their vehicle components, such as fender, wings, traffic lights and other lighting devices, rearview mirrors, among others, supporting metallic rods are commonly used materials that are secured to the vehicle by rubber rings and screws. The present invention provides for the replacement of metallic supporting rods and their rubber rings by supporting rods made of composite material, providing several advantages, including lightness, increased payload capacity of road implements and commercial vehicles in general, resulting in environmental and economic benefits, in addition to having its own damping system in its geometry.

Regarding the environmental benefits, a lighter supporting rod provides transport of more payload, reducing the number of required trips and fuel consumption, in addition to less wear and tear on other parts. Therefore, the invention provides less pollutant emission and less fuel/energy consumption when the vehicle travels empty. The invention also provides benefits in its manufacture, since the manufacture of parts in metallic materials demands equipment and labor that are costly and unhealthy, in addition to requiring subsequent finishing, such as painting, which increases the consumption of inputs. The present invention is free from the need for coating or painting, and it is possible to select the color of the composite before its manufacture so that it is ready for commercialization in the desired color.

Regarding the economic benefits, lower consumption generates less fuel expenses, higher payload brings advantage and savings in freight, fewer trips result in less wear on vehicle components, etc. Thus, the present invention brings a reduction in the TCO (Total Cost of Ownership) or total cost of ownership of consumers, so that the reduction in the tare of the components represents a reduction in the direct and indirect costs of the purchase and use of a commercial vehicle equipped with present invention, this being a point of great commercial importance.

Moreover, the geometry of the rod of the present invention is designed in order to provide its own damping system, generated by the synergy of the properties of the raw material and the geometry of the component itself, eliminating the need for damping rubber rings, thus reducing the number of components and reducing manufacturing and maintenance time and cost.

Therefore, the various advantages of the supporting rod of the present invention are clear.

There are certain requirements that are strongly desirable for a supporting rod to be commercially viable, such as, for example, meeting volumes and time of market cycles, enabling assembly in various chassis models, resisting bad weather (temperature, humidity, sunlight and cleaning chemicals—same weather conditions to which fender, wings, rearview mirror and lighting devices such as brake lights are subjected), allowing the use of standard tools available on assembly lines, using known transformation processes, providing service of cycle time and production volumes, supporting loading with performance at least equivalent to that already existing in the prior art, not snoring with a signal imposed by the implement, withstanding accidental loads and be interchangeable with current vehicle components. All these technical attributes are provided by the present invention.

Some of the requirements for the manufacture of the supporting rod are described below. The manufacture of commercial vehicles, such as road implements, annually exceeds the thousands, with a plurality of supporting rods in their chassis, which results in large quantities of supporting rods produced annually. Not only that, but the takt time (time available for production by market demand) exceeds hundreds of parts per day in large industries.

In addition to the large scale of production, the supporting rod must also enable mounting on the chassis of the commercial vehicle, where the center of the supporting rod up to the lower flange of the spar (defined as the upper limit) must reach an adequate length. Another point is that the supporting rod must withstand the elements (temperature, humidity, sunlight and cleaning chemicals, with the fender being used as a reference).

As mentioned above, the supporting rod must use standard tools available on the assembly line. Its manufacture must use known transformation processes and provide service for cycle time and production volumes, so as not to cause losses or changes in the processes. Moreover, the supporting rod must support the loads with a performance similar to the current solution in the prior art.

Another aspect of the present invention is to solve the problem of resonance, a typical problem of metallic supporting rods, and which leads to the loss of parts, failures or even damage to parts, as is the case with LED lights, whose lamp can fail due to vibration. The present invention solves this problem by not resonating with the signal imposed by the implement (where there is a frequency range to be avoided in the critical condition of unloaded implement) and supporting accidental loads. Also, the rod of the invention aims to prevent resonance at frequencies lower than a given frequency range in empty condition and at lower frequencies in loaded condition.

In an embodiment, the elastic modulus for bending force of the rod of the invention material varies in a range from 5 GPa to 50 GPa. In another embodiment, the elastic modulus for bending force of the rod material varies in a range from 10 GPa to 30 GPa. In an embodiment, the elastic modulus for bending force of the rod material is 15 GPa.

In an embodiment, the elastic modulus for tension force of the material of the rod of the invention varies in a range from 5 GPa to 50 GPa. In another embodiment, the elastic modulus for tension force of the rod material varies in a range from 10 GPa to 30 GPa. In an embodiment, the elastic modulus for tension force of the rod material is 18 GPa.

In an embodiment, the loss or damping factor of the material of the rod of the present invention varies in a range from 0.01 to 0.35, contributing to the energy dissipation of the present invention, aiding in its damping characteristic.

In an embodiment, the rod of the present invention comprises a composite (long fiber+resin) with a minimum flexural strength of 300 MPa, minimum flexural modulus of 15 GPa, minimum tensile strength of 150 MPa, minimum tensile modulus of 18 GPa and 1400 J/m minimum impact strength. In an embodiment, the supporting rod for commercial vehicles of the present invention comprises long random fibers. In another embodiment, the fibers are aligned with respect to the rod loading direction.

In an embodiment of said process, the resin is selected from: polyolefin resins in general such as polyester, epoxy, polyacrylate, polypropylene, polyurethane, nylon, polyamide, benzoxazines; as well as resins of vegetable origin, such as cellulose and starch, such as plasticized and modified starches, nanocellulose, among others.

In an embodiment of the aforementioned process, the long fiber is selected from: glass fibers (E-glass, S-glass, C-glass, R-glass or T-glass), carbon fiber, aramid fiber, basalt fiber, PBO (Zylon), PAN, Boron fibers, UHMW-PE fibers, PP fibers, quartz fibers, ceramic fibers, hybrid fibers (e.g., carbon/aramid), as well as fibers of plant origin such as cotton, cannabis, poppy, hemp, abaca, bamboo, coconut, flax, jute, kenaf, sisal, among others.

In an embodiment, in addition to fibers, the present invention further comprises nanoparticles as reinforcement for polymer matrices.

In an embodiment, the rod of the present invention further comprises a predefined failure region 1, with the failure region 1 being the region with the highest stress concentration of the rod, designed for such, in such a way that when the rod is subjected to a load greater than its resistance limit (being the load resulting from a bending, torsion, tension, impact, heat, among others): i) only a portion of the fibers in a cross section of the failure region 1 breaks; ii) a partial degradation of the resin occurs in a failure region 1; or iii) both situations can occur. These situations promote incomplete rupture of the supporting rod. In this way, the invention diverges from the rods of the prior art, which break completely and lead to the fall of vehicle components (such as fender) on the road and may lead to accidents and/or violations of traffic laws. The supporting rod of the present invention, on the other hand, promotes a partial and gradual fracture, thus preventing the rod and its associated vehicle component (such as fender) from falling on the road, giving the driver sufficient time take the vehicle to a maintenance station and change the rod.

In an embodiment, the base of the rod comprises one or more projections at an angle to the axial shaft of the rod, forming one or more structures of the French hand type integrated in the base itself. In an embodiment, the damping base 20 associating the rod with the vehicle and comprises an extension 30 extending from the damping base 20 in a direction away from the vehicle, the width of the damping base 20 being greater than the width of the extension 30. In an embodiment, the width of the rod varies along its length, the width of any portion of the rod near the vehicle being greater than the width of a portion of the rod distal to the vehicle. In an embodiment, the width of the damping base 20 varies along its length, the width close to the vehicle being greater than the width far away. In an embodiment, the width of the extension 30 varies along its length, the width close to the vehicle being greater than the width far away.

In an embodiment, the damping base 20 comprises an upper bow 21 and a lower bow 21, a central vertical region 22 delimited by the bows 21 and at least one association component 23 with non-permanent attachment elements for association with the vehicle.

In an embodiment, the damping base 20 or the association component 23 comprises holes wherein screws are attached for removable attachment of the rod to the vehicle chassis. In another embodiment, the central vertical region 22 is provided with a cavity, through which a metallic association component 23 is positioned, provided with holes that associate the rod to the vehicle chassis through non-permanent attachments, such as screws.

In an embodiment, the extension 30 comprises a vertical portion 31 and two horizontal portions 32 one above the vertical portion 31 and the other below the vertical portion 31. The width of each horizontal portion 32 is greater than the width of the vertical portion 31 defining a cross section of the extension 30 in a predominantly "I" shape.

In an embodiment, the extension 30 further comprises, in its vertical portion 31, at least one protrusion 33 associating with non-permanent fasteners associating with vehicle components such as fender. The protrusions 33 are provided with holes designed to receive non-permanent/removable association elements, such as screws, promoting a non-permanent fit of the vehicle component to the rod, thus allowing for easy assembly and disassembly, both in manufacture and in maintenance.

In an embodiment, each protrusion 33 is provided with at least two adjacent holes, so that they promote interchangeability between multiple vehicle component models, allowing the fitting of models of different dimensions present on the market, thus bringing gains in manufacturing and commercialization of the present invention rod.

In summary, the invention solves several technical problems with the use of structural composite material, including the choice of a geometry favorable to the absorption of the component's mechanical-dynamic efforts, thus providing reinforcement at points of greater structural demand. The material used also provides adequate mechanical responses regarding structural fatigue and the constructive form predicts the failure mode of the rod in the failure region 1, which avoids the loss of components on the highways.

The technical benefits and effects of the invention are not limited to the product itself, but also to the process for obtaining it.

In an embodiment, the process for manufacturing of the supporting rod of the present invention provides environmental and economic benefits, since the manufacture of parts in metallic materials requires high cost and unhealthy equipment and labor, in addition to requiring subsequent finishing, such as painting, which increases the consumption of inputs. The present invention is free from the need for painting, and it is possible to select the color of the composite before its manufacture so that it is ready for commercialization in the desired color, presenting energy consumption and emission of pollutants much lower when compared to the manufacture of metallic rods.

In an embodiment, the step of mixing at least one long fiber with at least one resin comprises 30% to 50% by mass of softwood in the mixture. In another embodiment, the blend comprises 35% by mass of long fiber.

In an embodiment, from the choice of long fiber+resin mixture, strips of material are cut in specific positions according to a previously defined strategy.

In an embodiment, the preferential strategy of cutting position of the fibers follows the preferential alignment of the fibers according to the geometric and stress distribution factors in the final component. This strategy is based on computational mathematical modeling of the finished product.

In an embodiment, the long fiber+resin mixture is a laminate at least 900 mm wide.

In an embodiment, the step of inserting the fiber+resin mixture into a mold comprises a preliminary step of preparing said mold with a release agent. After inserting the mixture into the mold, the mold and/or the mixture is heated to a temperature between 100° C. and 300° C. In an embodiment, the mold is heated to a temperature between 150° C. and 250° C. In another embodiment, the mixture is heated to a temperature between 150° C. and 250° C. In another embodiment, the mold and the mixture are heated to a temperature between 150° C. and 250° C.

Subsequently, the mixture is pressed. In an embodiment, the pressing step comprises using a press associated with a counter-mold. In an embodiment, pressing is done at a range of 10 kgf/cm$^2$ to 100 kgf/cm$^2$. In an embodiment, the pressing step is done over a period of 1 to 10 minutes. In an embodiment, the pressing step is carried out until the resin cures.

After the resin has cured, forming the supporting rod in structural composite material, the supporting rod in composite material is demolded. In an embodiment, the rod is taken to the finishing step with fine geometric adjustment.

In an embodiment, the mold used in the process of the present invention comprises a cavity having a cavity for producing a damping base 20, a cavity for producing an extension 30 and a cavity for producing a predefined failure region 1, the damping base 20 being associated with the extension 30 by the failure region 1, wherein the width of the damping base 20 is greater than the width of the extension 30, so that the failure region 1 delimits a section of abrupt dimensional variation of the rod, presenting a tension concentrating region. Accordingly, the present invention process makes it possible to produce rods with a predefined and non-catastrophic failure mode.

The fact that the failure region 1 of the support of the present invention is designed and constructed of structural composite material prevents the total disruption of its structure from occurring, with only a partial break, thus preventing the part from falling uncontrollably on the road and, mainly, the fact that the failure is designed and predefined allows the part to break at a point where there is no loss of the part, i.e., the part associated with the chassis up to the first anchorage point of the vehicle component always remains integral, giving the vehicle user the option to go to the replacement location without losing the component on the road. In this way, the vehicle component supported by the rod of the invention, whether a fender with wings or a signal light or other similar vehicle component, does not fall on the road, thus complying with the legal rules.

In an embodiment, this failure region 1 is formed with a geometry that has less mechanical strength in the specific region, in such a way that it is possible to predict, if a failure occurs, that this failure occurs in the specific region or near to the specific region, bringing greater safety, i.e., preventing the part from breaking in undesirable regions.

Thus, the present invention provides several advantages over the prior art such as allowing the manufacture of composite supporting rod, mass reduction, reduction of fasteners (diameter and quantity), color customization, increased output (smaller number of processes), inventory reduction, takt time reduction, reduced damage to the vehicle component supported by the rod, no stress concentrator required, increased fatigue life, increased corrosion life, modern design, integrated fasteners, geometry which allows interchangeability, smooth surface and surface finish, symmetrical assembly, better ergonomics for the assembly of the part and, if failures occur, it occurs in a predictive way, in addition to the rod not breaking completely.

EXAMPLES

The examples shown herein are intended only to exemplify one of the numerous ways of carrying out the invention, however without limiting its scope. In various embodiments, tests have been carried out in which the rod of the invention supports a fender or a mud-covered fender.

Example 1—Performance in Multiple Tests

Figure 10:
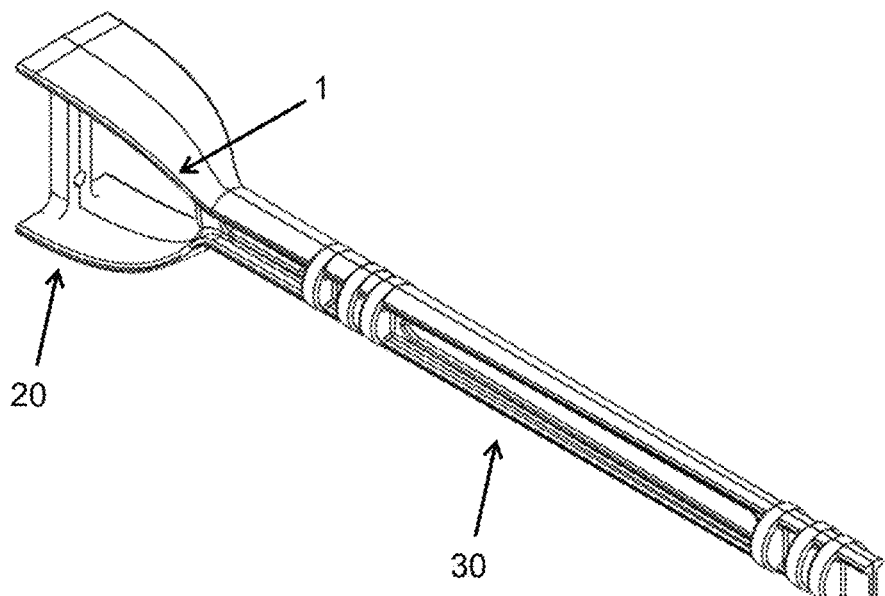
FIG. 10 shows a perspective view of another embodiment of the supporting rod of the present invention.
Figure 11:
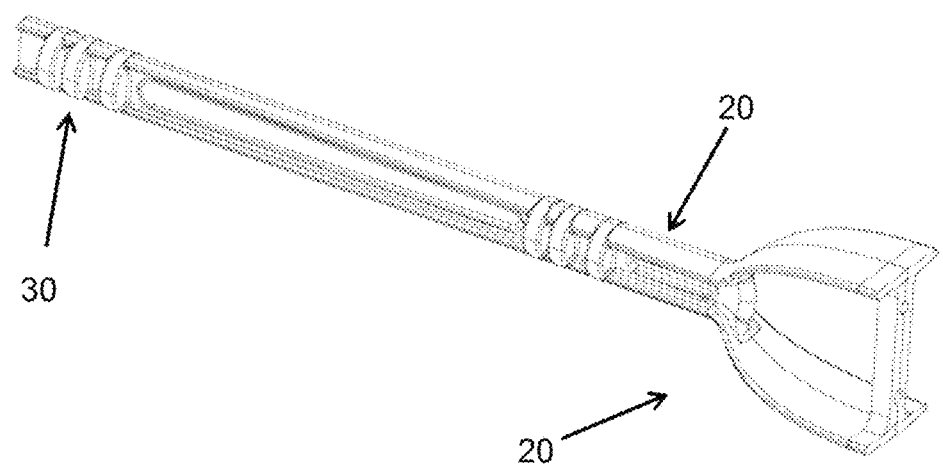
FIG. 11 shows another perspective view of the embodiment shown in FIG. 10.
Figure 12:
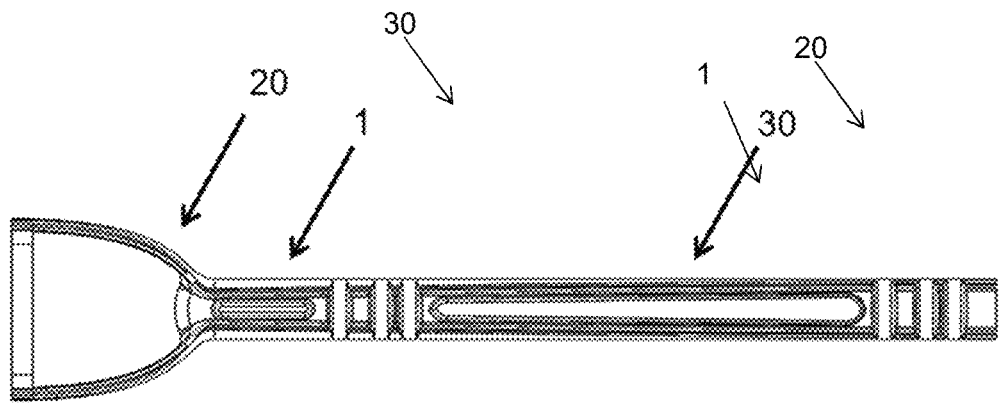
FIG. 12 shows another perspective view of the embodiment shown in FIG. 10.
Figure 13:
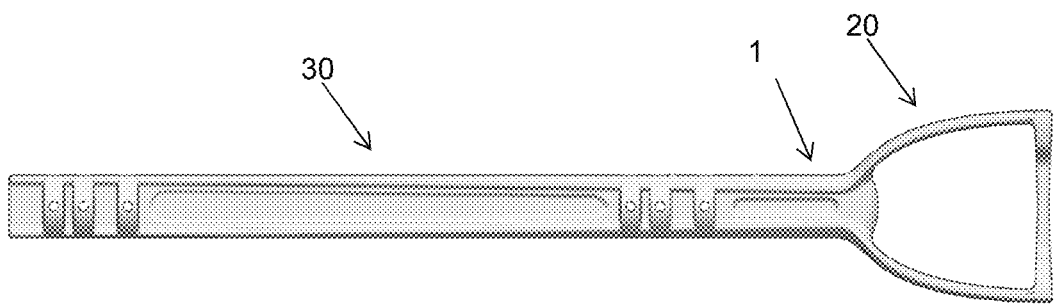
FIGS. 13 to 16 show the different views of the embodiment of the supporting rod of FIGS. 10 to 12.
Figure 14:
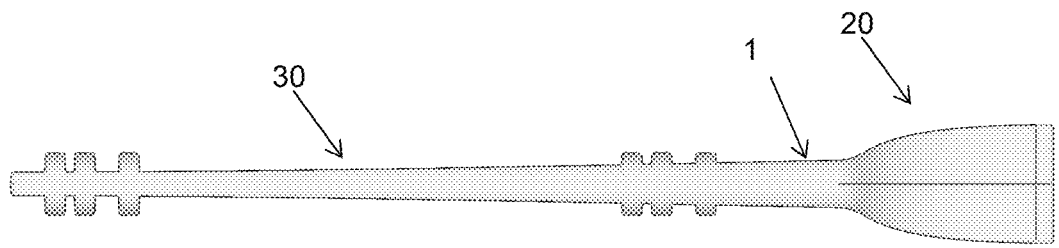
Figure 15:
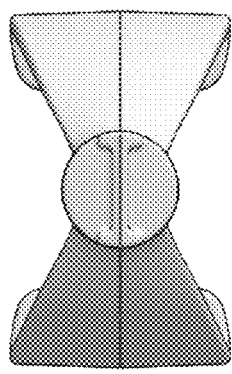
Figure 16:
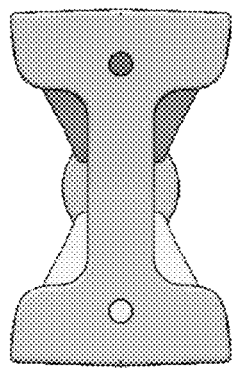
Figure 17:
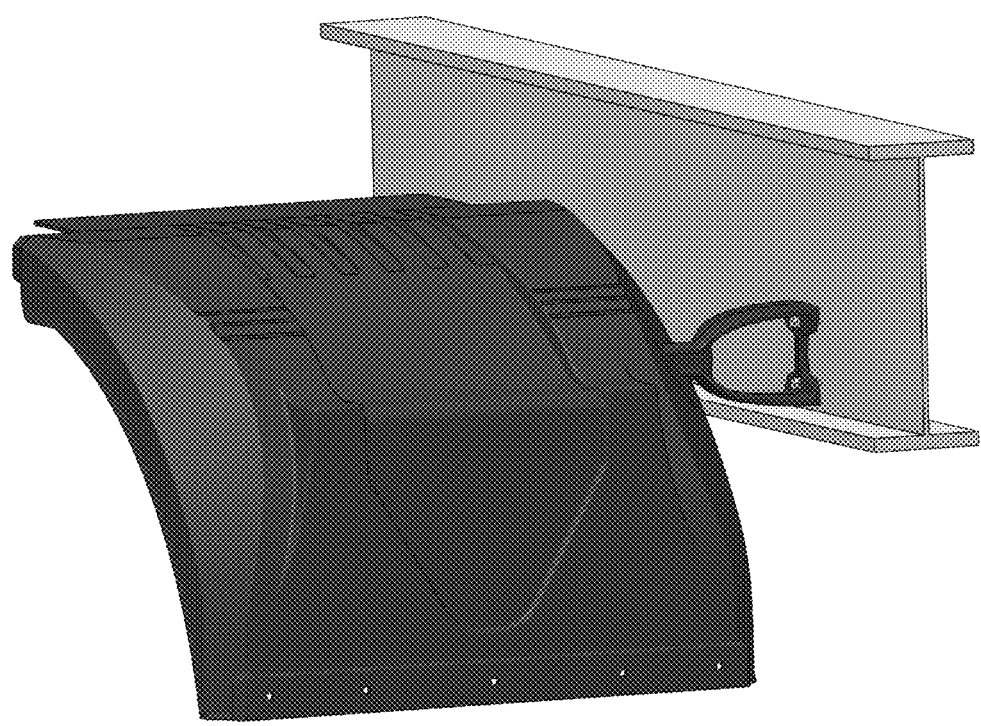
FIG. 17 shows an embodiment of a supporting rod of the present invention associated with a fender and the chassis of a road implement.
Figure 18:
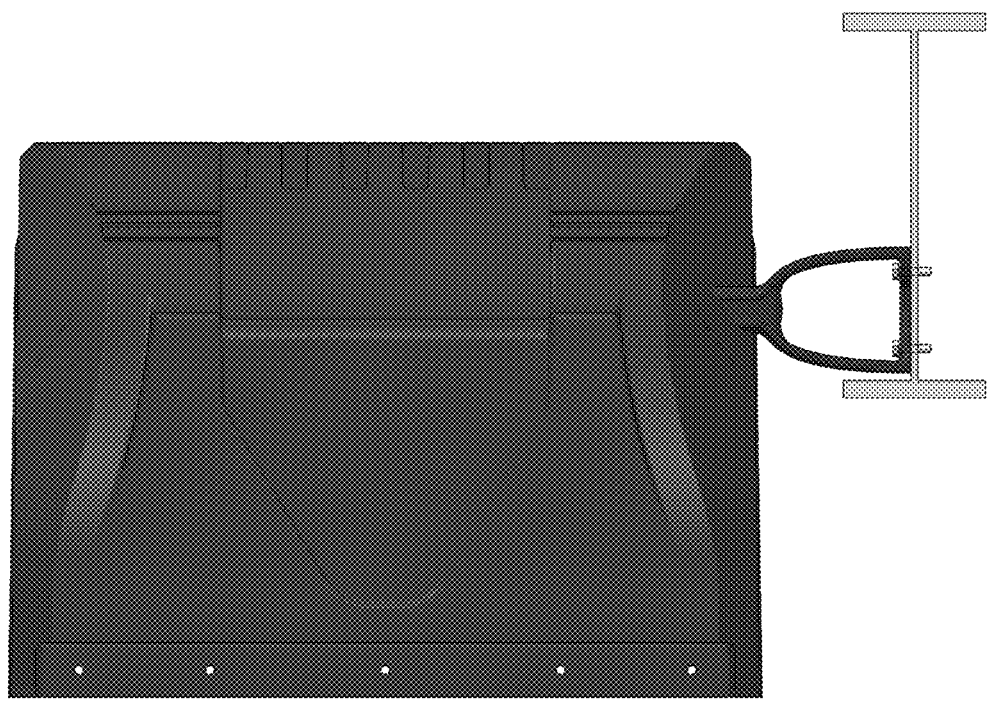
FIG. 18 shows an embodiment of a supporting rod of the present invention associated with a fender and the chassis of a road implement.
Figure 19:
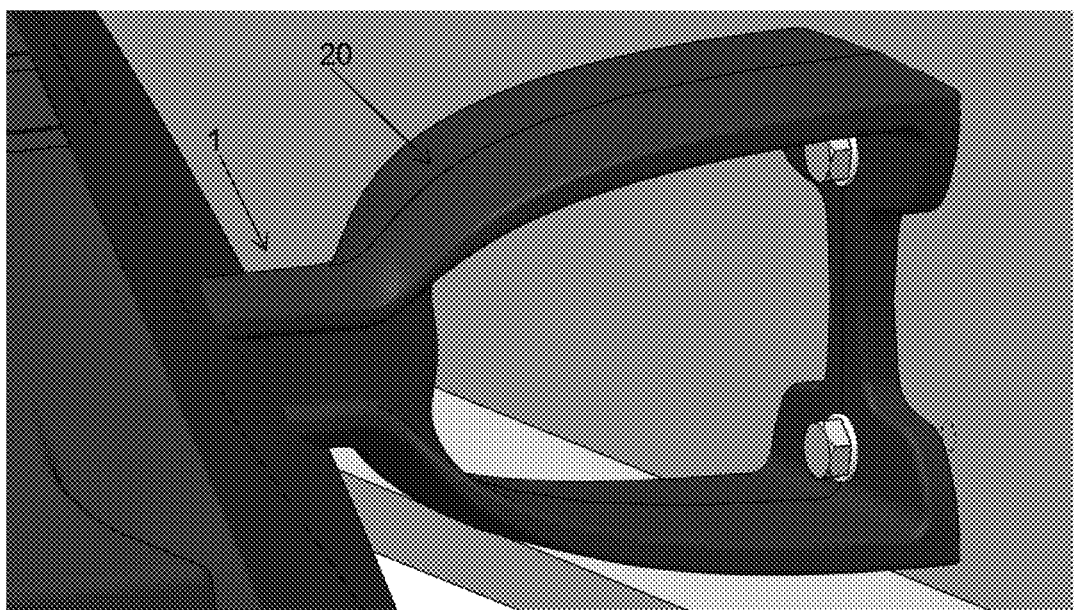
FIG. 19 shows an embodiment of the damping base of the supporting rod of the present invention associated with a fender and the chassis of a road implement.
Figure 20:
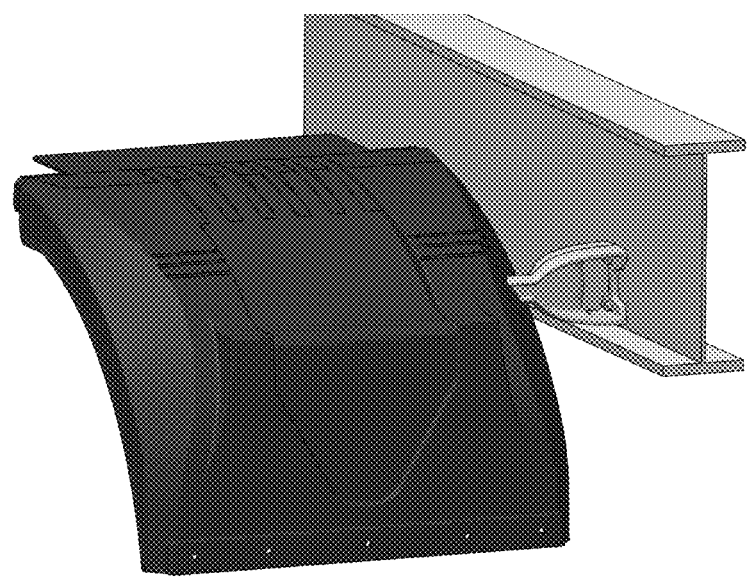
FIG. 20 shows another embodiment of a supporting rod of the present invention associated with a fender and the chassis of a road implement.
Figure 21:
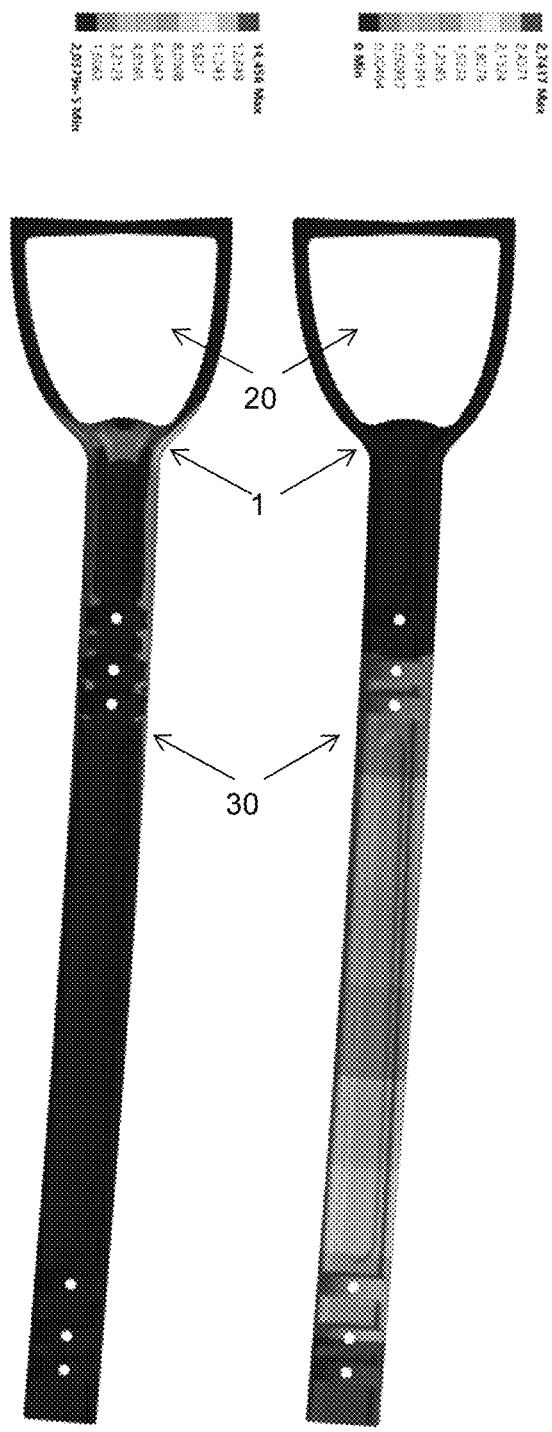
FIG. 21 shows an analysis of stresses and deformations performed on an embodiment of a supporting rod of the present invention.
Figure 22:
FIG. 22 shows an embodiment of the load analysis of an embodiment of the present invention.
Figure 23:
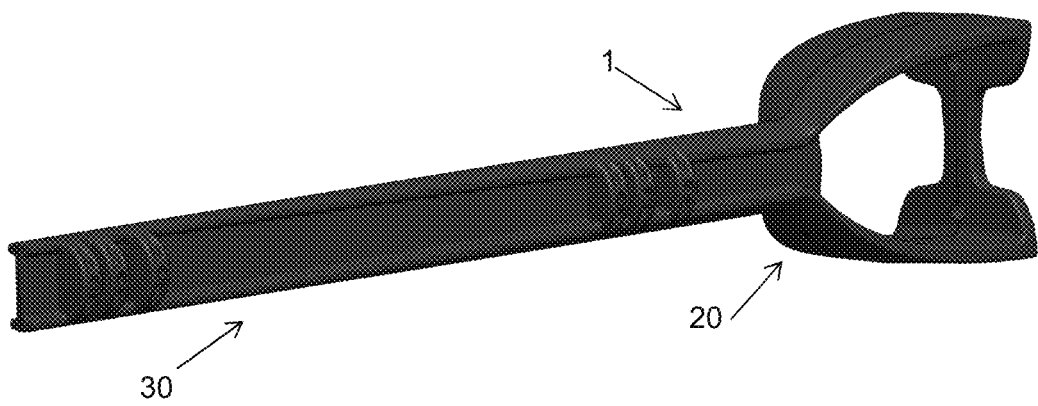
FIG. 23 shows a perspective view of an embodiment of a supporting rod of the present invention.
Figure 24:
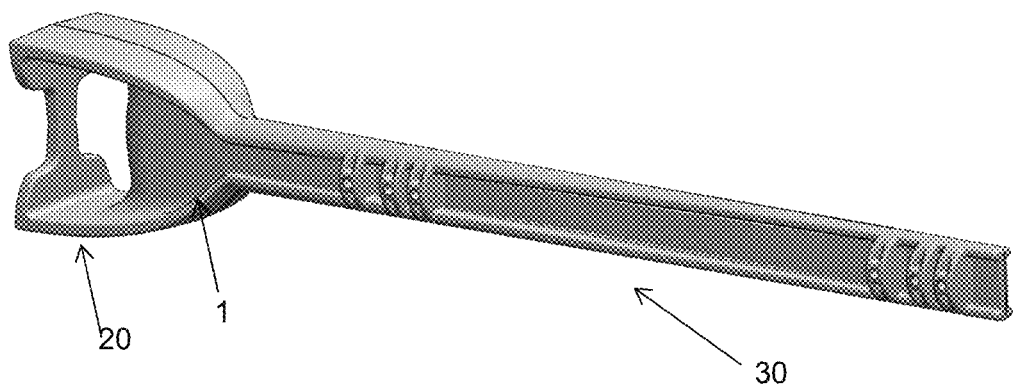
FIG. 24 shows another embodiment of the supporting rod of the present invention seen in perspective.
Figure 25:
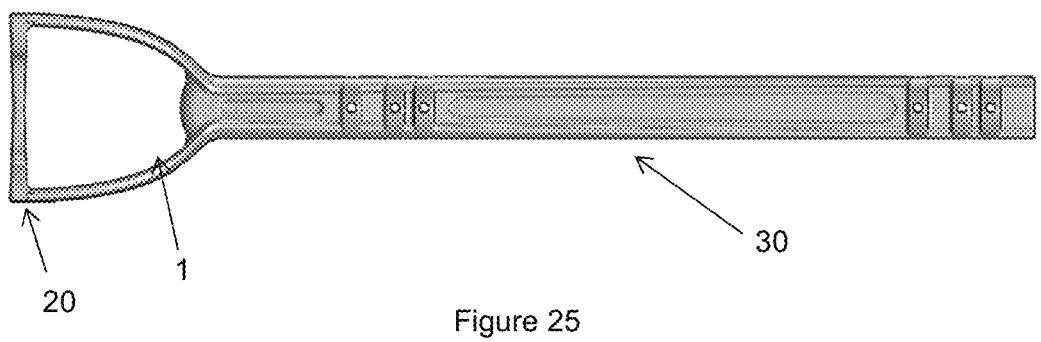
FIG. 25 shows a side view of the embodiment of FIG. 24

Table 1 shows the result of performance tests in an embodiment of rod of the invention, illustrated by FIGS. 10 to 12 for up to 240 days.

TABLE 1

Tests and Respective Results

| Characteristic | Rule | Unit | Distinction | 0 Days | 90 Days | 150 Days | 210 Days | 219 Days | 240 Days |
|---|---|---|---|---|---|---|---|---|---|
| Bending Strength | ASTM D-790 | MPa | Min. 300 | 312.0 | 363.0 | 333.9 | 321.9 | 316.4 | 324.8 |
| Elastic Modulus for Bending | ASTM D-790 | GPa | Min. 15 | 15.4 | 19.9 | 20.0 | 17.0 | 16.0 | 16.0 |
| Tensile strength | ASTM D-638 | MPa | Min. 150 | 221.8 | 200.8 | 160.4 | 164.3 | 159.7 | 195.6 |
| Elastic Modulus for Tension | ASTM D-638 | GPa | Min. 18 | 22.0 | 19.7 | 18.5 | 19.0 | 19.0 | 19.0 |
| Impact strength IZOD with slot | ASTM D-256 | J/m | Min. 1400 | 2246.5 | 1784.5 | 1625.8 | 1863.5 | 1750.1 | 1611.4 |
| Contraction | ASTM D-792 | % | −0.100 to 0.100 | −0.008 | −0.008 | 0.032 | 0.032 | 0.006 | 0.006 |
| Density | ASTM D-955 | g/cm$^3$ | 1.80 to 2.00 | 1.86 | 1.87 | 1.84 | 1.83 | 1.87 | 1.85 |

Tests were used with three types of materials: thermoset with 10% to 60% by mass of woven fabric fiber (identification 0133-19), thermoset with 10 to 60% discontinuous fiber (identification 0134-19) and thermoplastic with discontinuous fiber (identification 0135-19).

Figure 27:
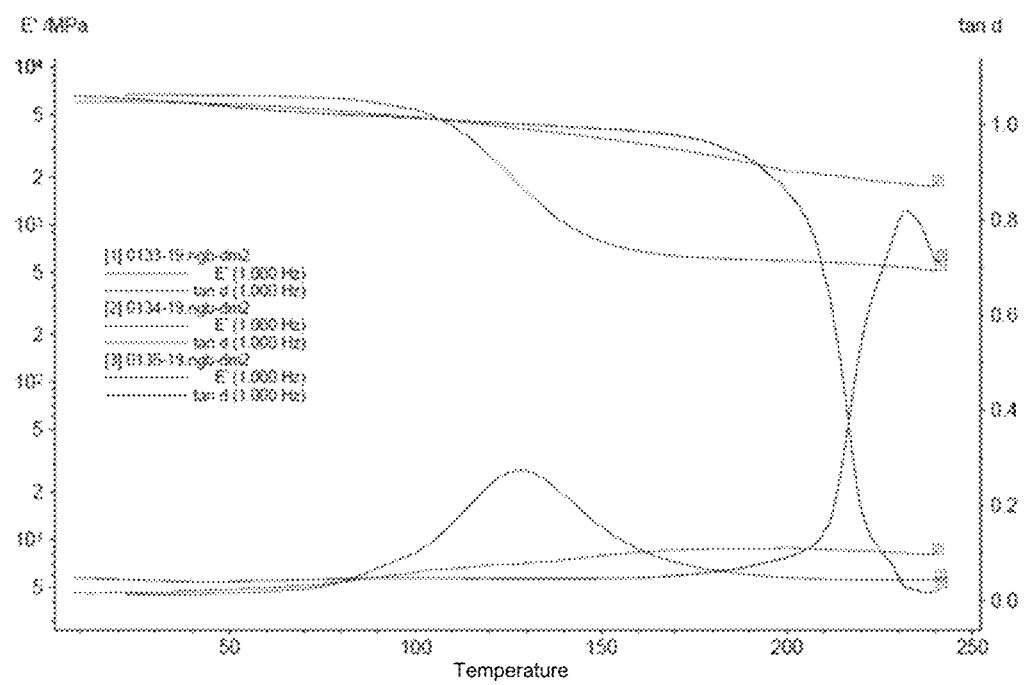
FIG. 27 shows a graph of a dynamic mechanical analysis (DMA) performed on an embodiment of the present invention.
Figure 28:
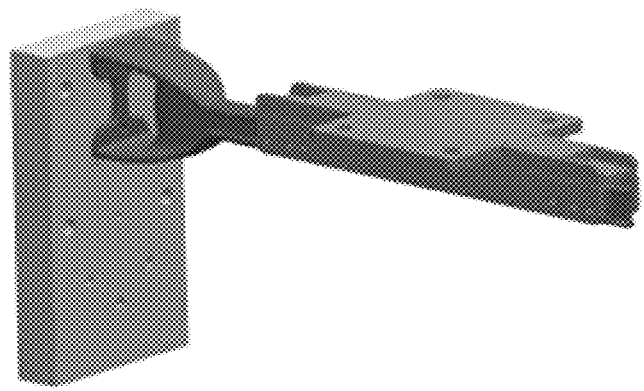
FIG. 28 shows an embodiment of a static test device used to test an embodiment of a supporting rod of the present invention.
Figure 29:
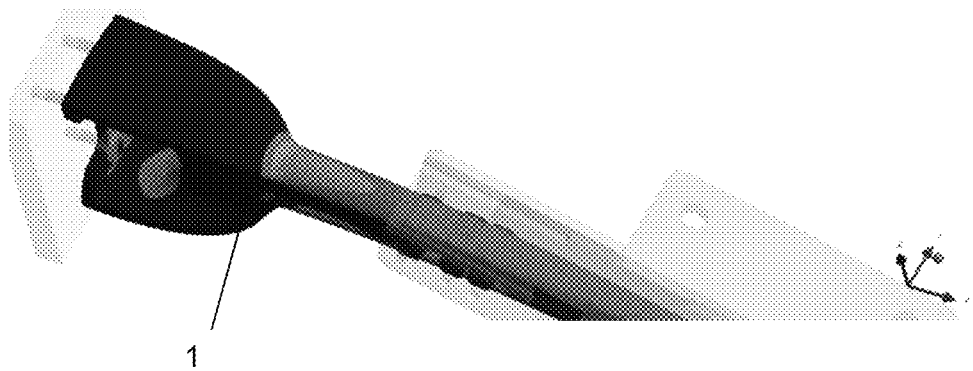
FIG. 29 shows an embodiment of the analysis of stresses and deformations of an embodiment of a supporting rod of the present invention associated with the static test device.
Figure 30:
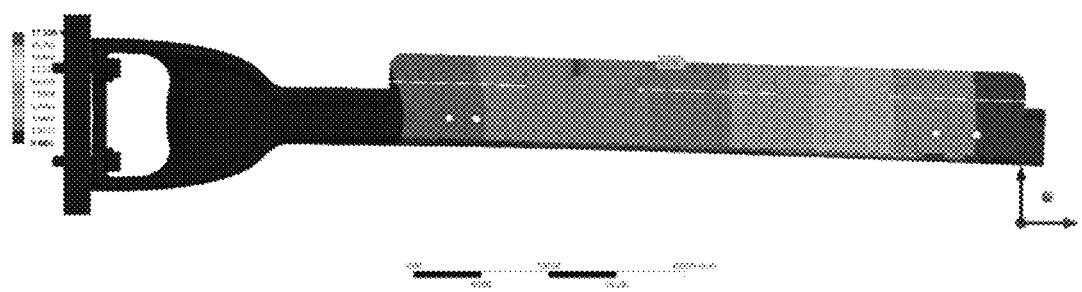
FIG. 30 shows the analysis of stresses and deformations of an embodiment of a supporting rod of the present invention associated with the static test device.
Figure 31:
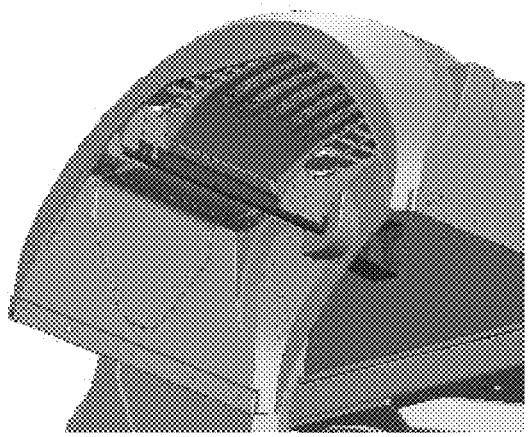
FIG. 31 shows an embodiment of a supporting rod of the present invention associated with a fender and a bench with 1 degree of freedom.
Figure 32:
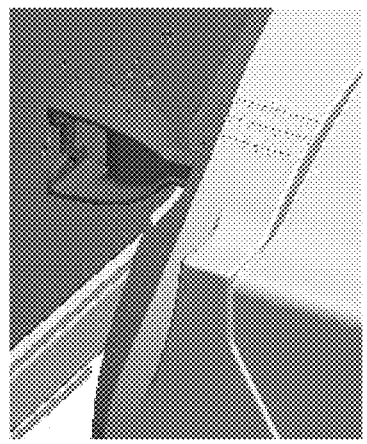
FIG. 32 shows an embodiment of a supporting rod of the present invention associated with a fender and a bench with 1 degree of freedom.

Tensile stresses were applied to these three materials to identify their tension at maximum force (MPa). Dynamic mechanical analysis (DMA) was also performed, analyzing Tg (° C.), tan δ and mass loss (up to 240° C.) in percentage, as illustrated in FIG. 27.

Table 2 shows the results of dynamic mechanical analysis (DMA) and tensile testing:

TABLE 2

Dynamic Mechanical Analysis and tensile test

|  |  | 0133-19 | 0134-19 | 0135-19 |
|---|---|---|---|---|
| DMA | Tg (° C.) | 101 | 67 | 199 |
|  | tan δ (° C.) | 128 | 194 | 232 |
|  | Mass Loss (%) | 0.80 | 0.89 | 2.56 |
| Tensile test | Tension at maximum force (MPa) | 209 ± 24 | 34.4 ± 4.6 | 165 ± 12.5 |

From the above table it is evident that the properties of the present invention are highly satisfactory.

Example 2—Quasi-Static and Fatigue of the Supporting Rod Test

Figure 3:
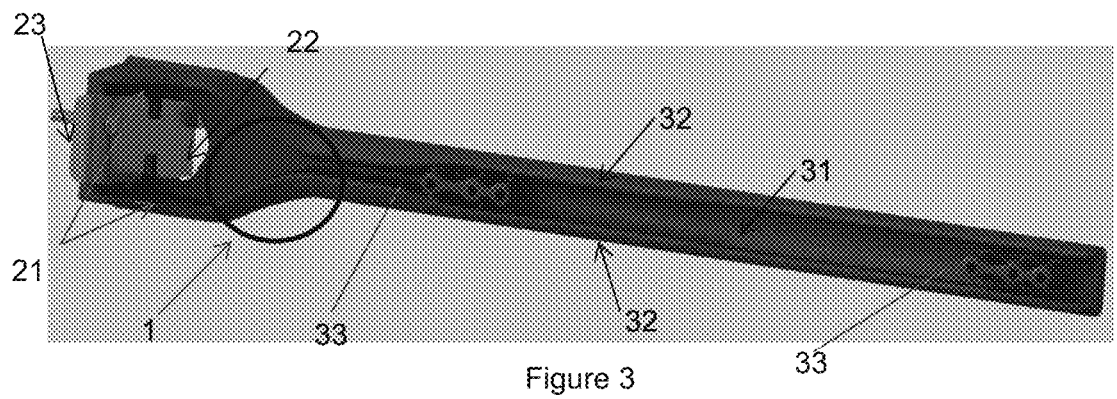
FIG. 3 shows a perspective view of another embodiment of the supporting rod of the present invention.

For selecting a supporting rod with a geometry and design favorable to the desired applications, several prototypes were developed as illustrated in FIGS. 42 to 53. Among these, the supporting rods illustrated in FIG. 3 were selected for further tests.

Figure 26:
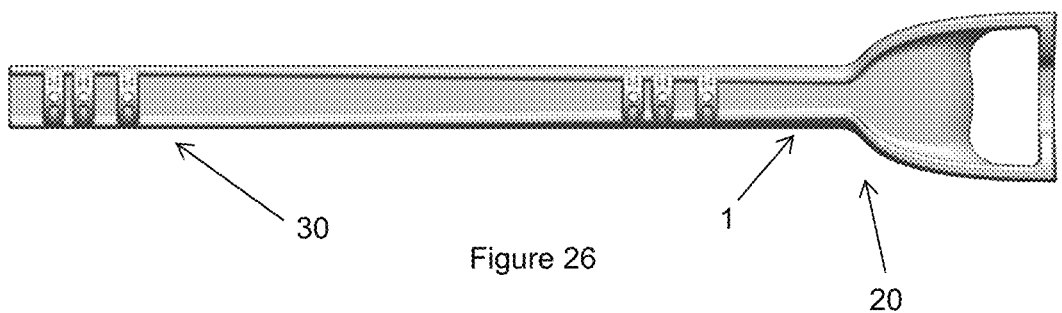
FIG. 26 shows a right-side view of an embodiment of a supporting rod of the present invention.
Figure 57:
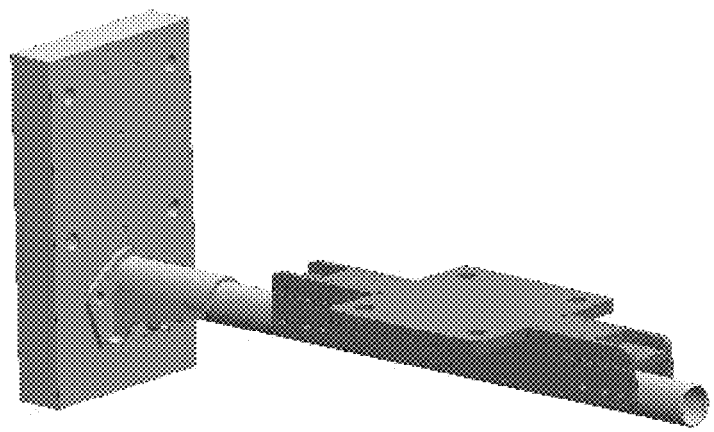
FIG. 57 shows a static test device associated with the supporting rod of the prior art.
Figure 58:
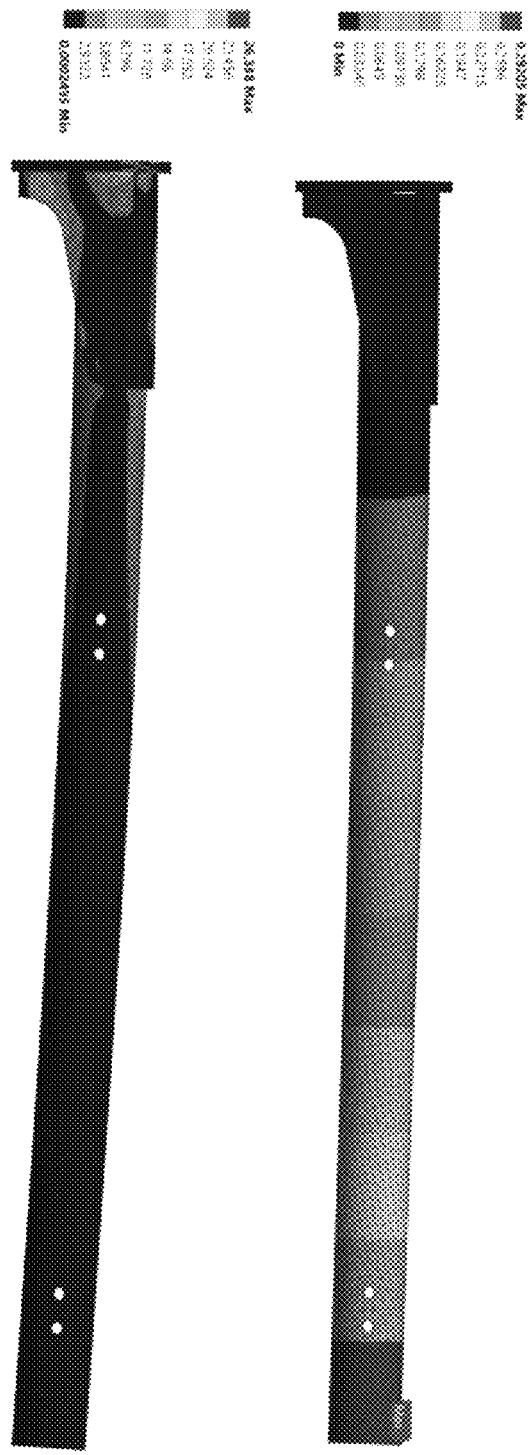
FIG. 58 shows an analysis of tensions and deformations of the supporting rod of the prior art.
Figure 59:
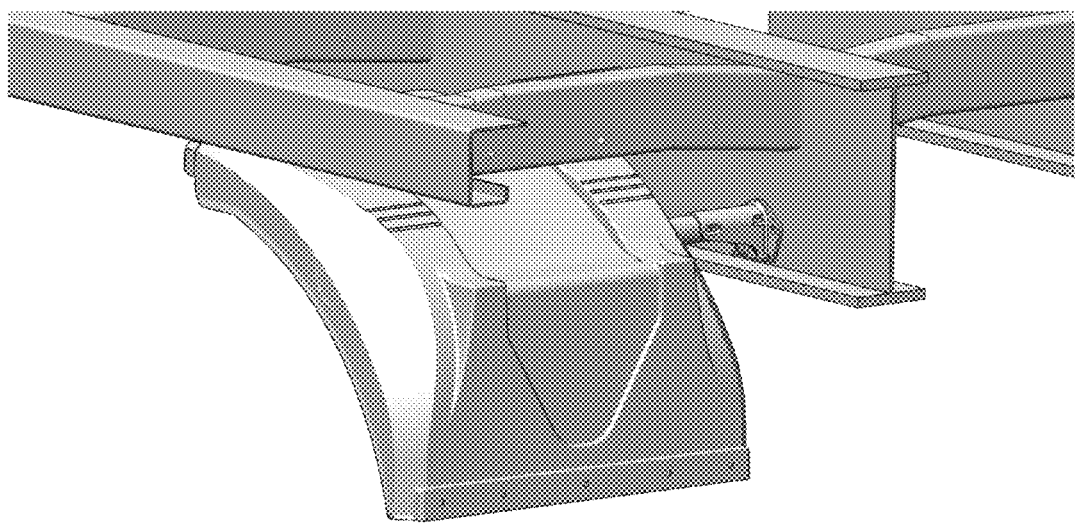
FIG. 59 shows an embodiment of the supporting rod of the prior art associated with a fender.

Quasi-static and fatigue tests were performed to reveal the structural conditions of the part (supporting rod). For this, it was mounted in a validation device as illustrated in FIGS. 26 and 57, samples of the composite rod, in FIG. 26, in front of a metallic rod of the prior art, in FIG. 57. For the quasi-static step, five samples were used and for the fatigue steps three samples were used.

Figure 4:
FIG. 4 shows an embodiment of a supporting rod of the present invention being subjected to a stress test.
Figure 5:
FIG. 5 shows an embodiment of a supporting rod of the present invention, mounted on a fender, being subjected to a stress test.
Figure 6:
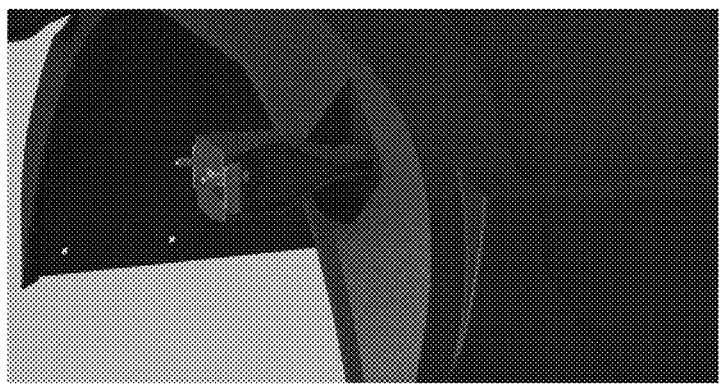
FIG. 6 shows an embodiment of a supporting rod of the present invention mounted in fender.
Figure 7:
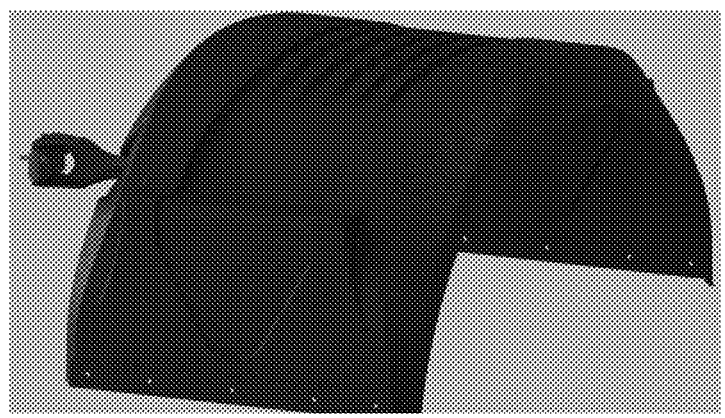
FIG. 7 shows another view of the supporting rod of the present invention mounted on a fender, as shown in FIG. 6.
Figure 8:
FIG. 8 shows an embodiment of a supporting rod of the present invention being subjected to a stress test.

Quasi-Static:

Quasi-static loading was applied until the component is completely broken, in both directions (up and down) as illustrated in FIGS. 4, 5 and 8.

Fatigue:

1) Cyclic load was applied with magnitude of 95% of the maximum load recorded in quasi-static measurement, until the item is completely broken.

2) Cyclic load was applied with magnitude of 60 to 100% quasi-static measurement until complete breakage of the item. In an embodiment, cyclic loading with a magnitude of 80% to 95% of the quasi-static measurement was applied until the item was completely broken.

Figure 9:
FIG. 9 shows an embodiment of the supporting rod of the present invention being subjected to a failure mode test, being shown in case of breaking of the supporting rod, its body is not completely ruptured, and the extension of the rod remains connected to the damping base.

3) Cyclic load was applied with a magnitude between 50 to 90% of the maximum load recorded in quasi-static measurement until the total rupture of item as illustrated in FIG. 9. In an embodiment, a cyclic load with a magnitude of 80% of the load was applied maximum recorded in quasi-static measurement until total breakage of the item.

For this test, supporting rods with equal process parameters, identified and tracked, metallic supports for supporting rod with a number of varied holes, metallic supporting rods of the prior art, replacement and new, applicator static test device, base static test device, plate column, MTS actuator and torquemeter were used. The frequency was adjusted so as not to generate increased temperature of the part in the probable failure region.

Example 3—Test of Failure Due to Creep Mechanism in Loads and Temperatures

Figure 33:
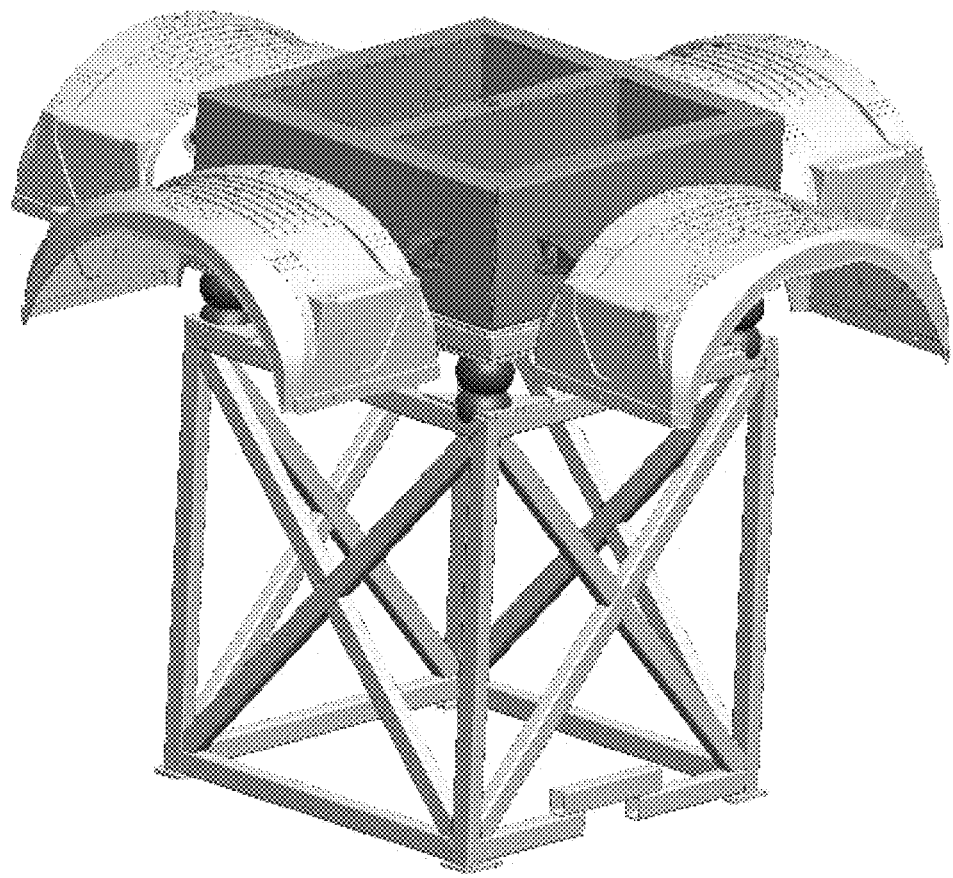
FIG. 33 shows an embodiment of a supporting rod of the present invention associated with a fender and a bench with 1 degree of freedom.
Figure 34:
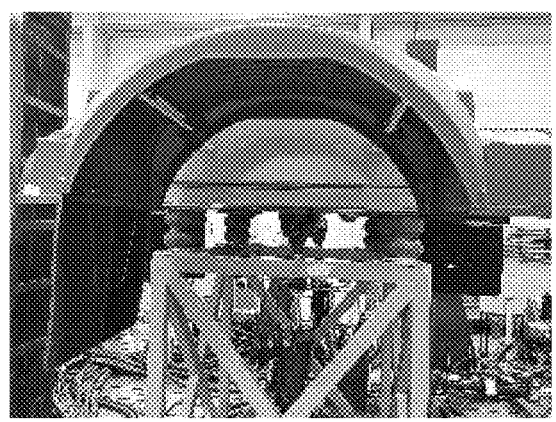
FIG. 34 shows a photograph of an embodiment of a supporting rod of the present invention associated with a fender and a bench with 1 degree of freedom, illustrating a practical application of the embodiments illustrated in FIGS. 31 to 33.
Figure 35:
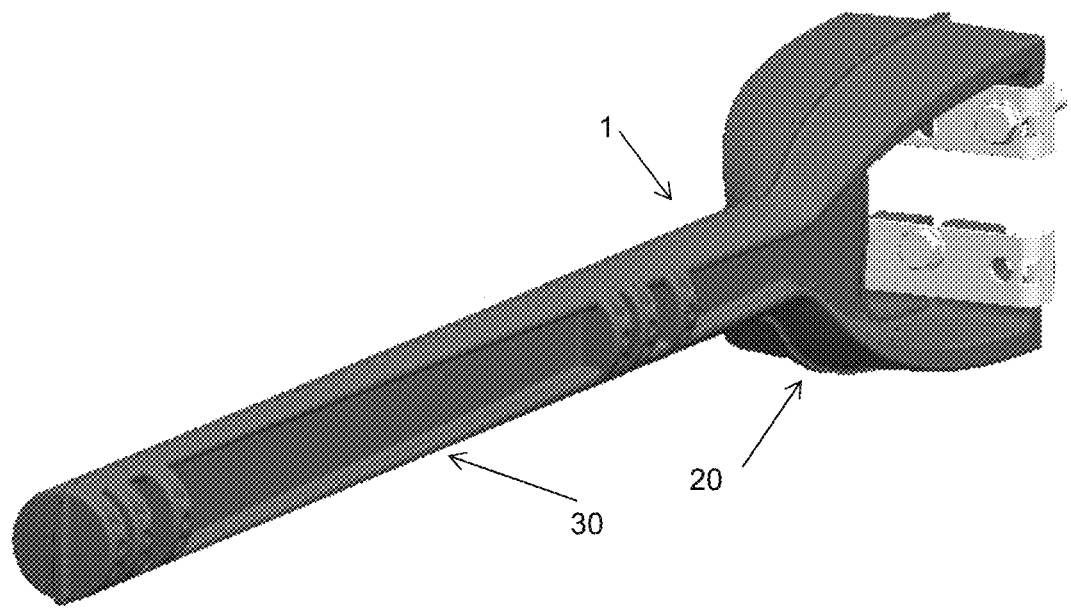
FIG. 35 shows an embodiment of supporting rod of the present invention with burr for burr impact analysis.
Figure 36:
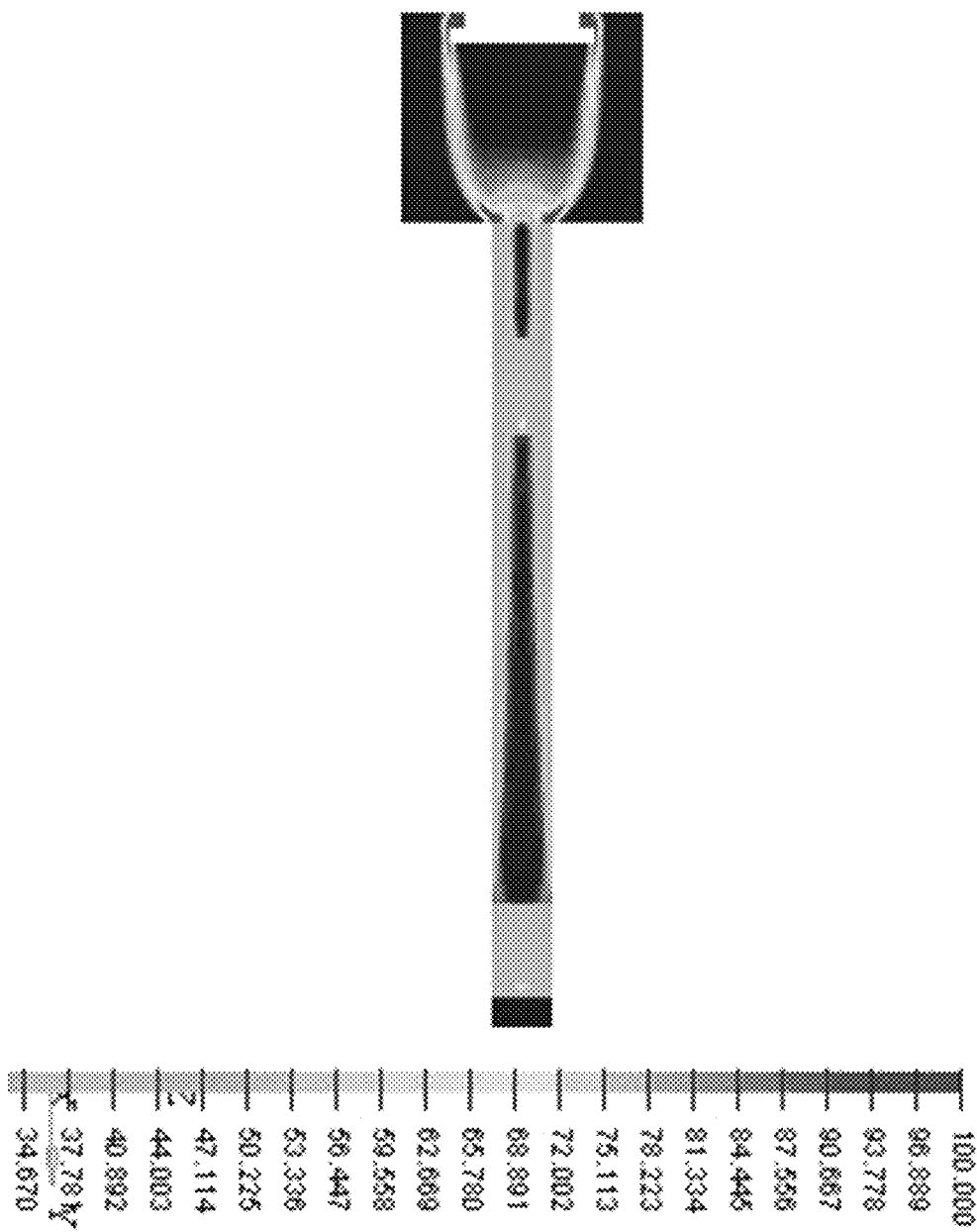
FIG. 36 shows the analysis of stresses and deformations of an embodiment of a supporting rod of the present invention.
Figure 37:
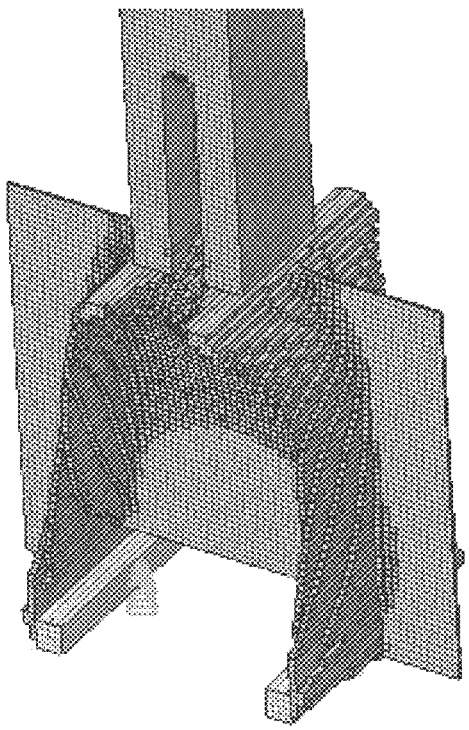
FIG. 37 shows an embodiment of the topology of the supporting rod of the present invention.
Figure 38:
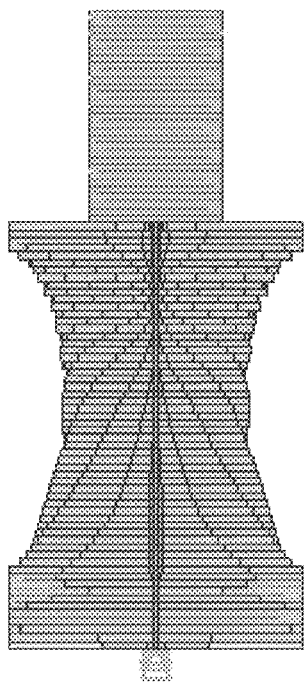
FIG. 38 shows an embodiment of the topology of the supporting rod of the present invention.
Figure 39:
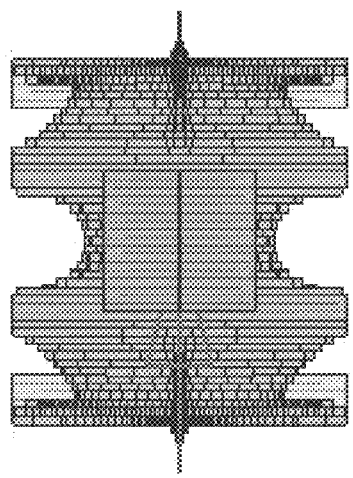
FIG. 39 shows an embodiment of the topology of the supporting rod of the present invention.
Figure 40:
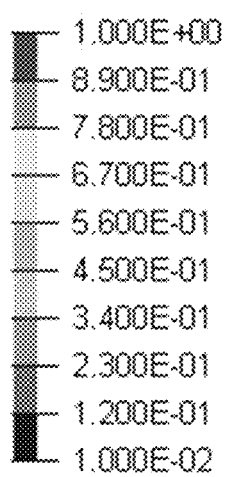
FIG. 40 shows a topology analysis of an embodiment of a supporting rod of the present invention.
Figure 40:
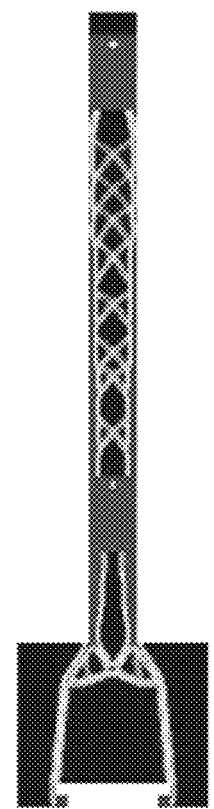
Figure 41:
FIG. 41 shows a topology analysis of an embodiment of a supporting rod of the present invention.
Figure 42:
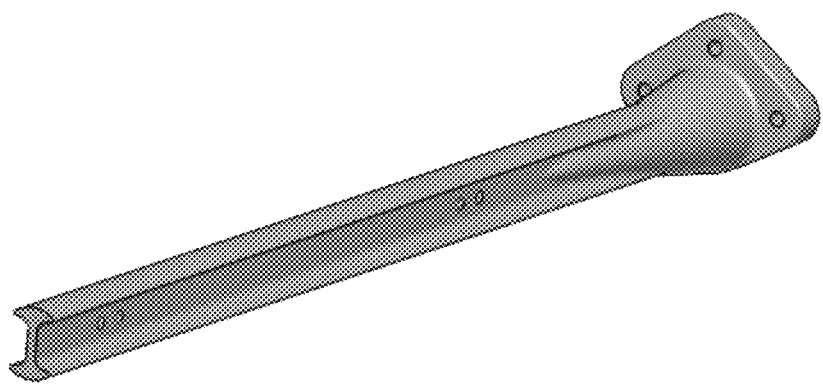
FIG. 42 shows an embodiment of a supporting rod of the present invention.
Figure 43:
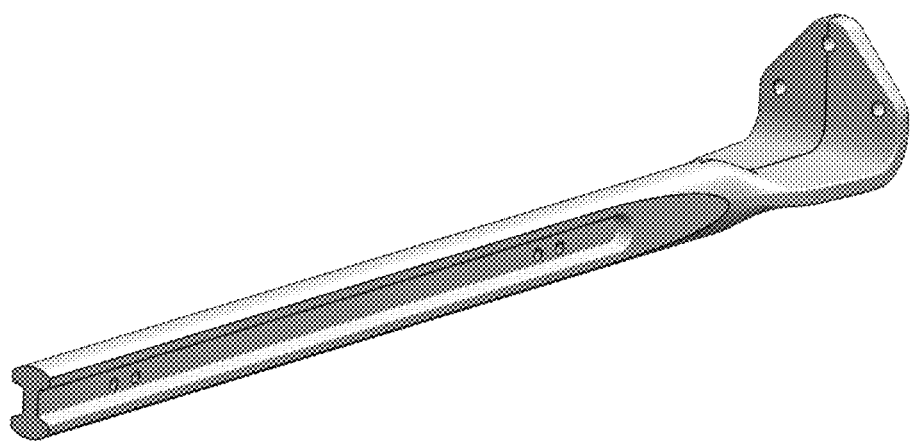
FIG. 43 shows an embodiment of a supporting rod of the present invention.
Figure 44:
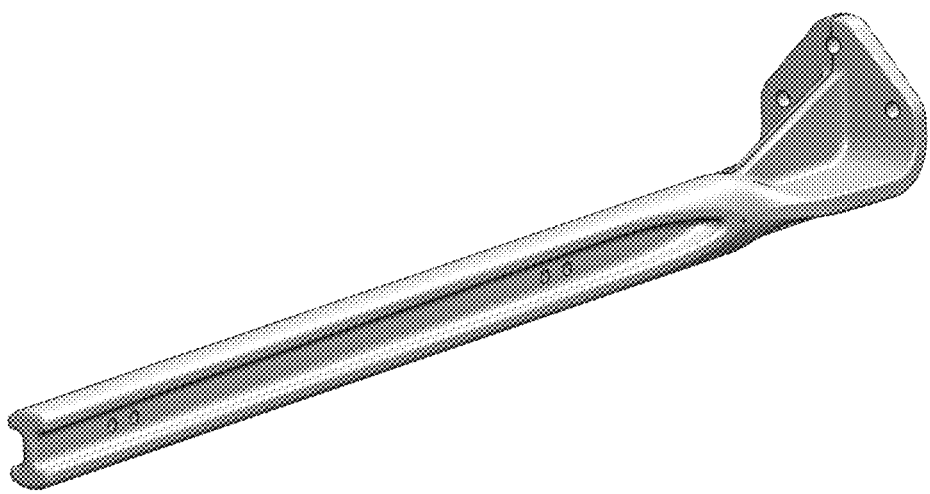
FIG. 44 shows an embodiment of a supporting rod of the present invention.
Figure 45:
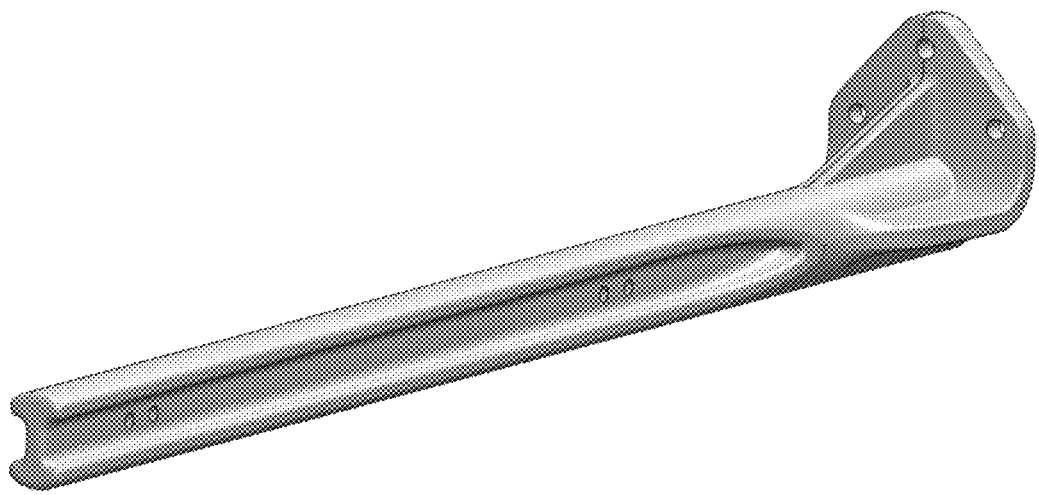
FIG. 45 shows an embodiment of a supporting rod of the present invention.
Figure 46:
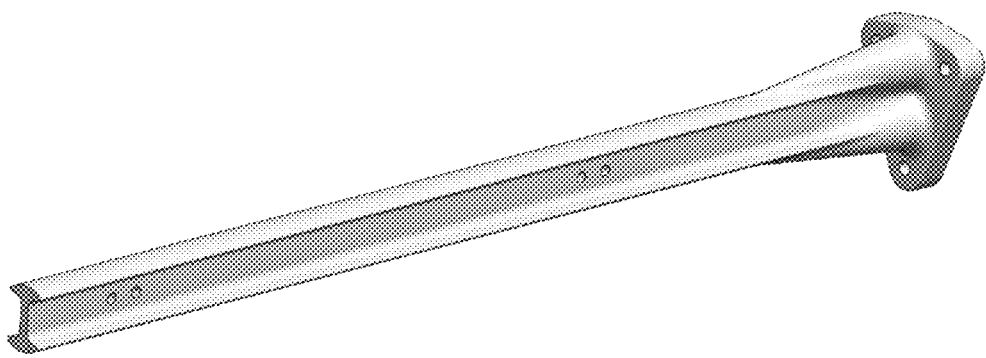
FIG. 46 shows an embodiment of a supporting rod of the present invention.
Figure 47:
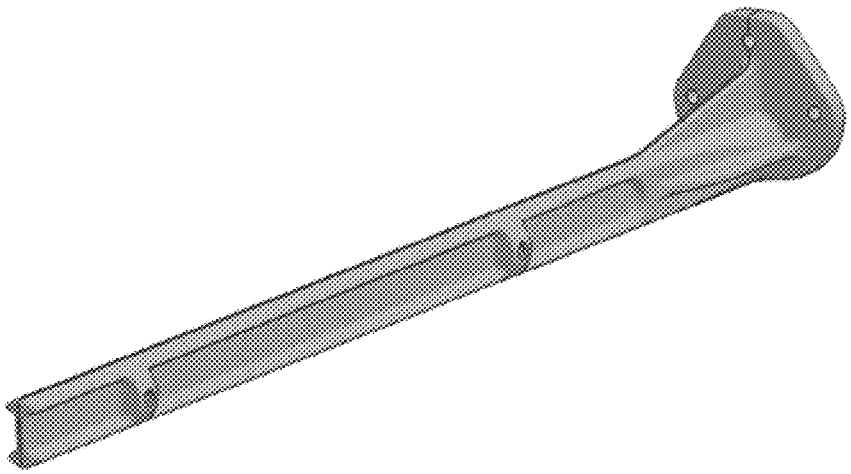
FIG. 47 shows an embodiment of a supporting rod of the present invention.
Figure 48:
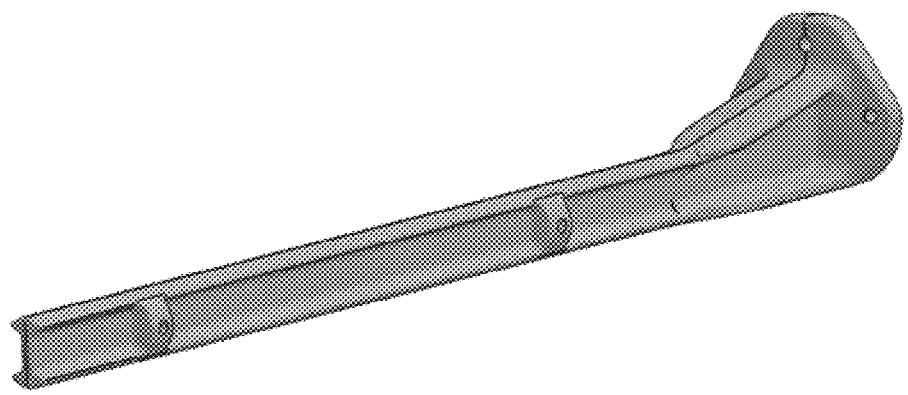
FIG. 48 shows an embodiment of a supporting rod of the present invention.
Figure 49:
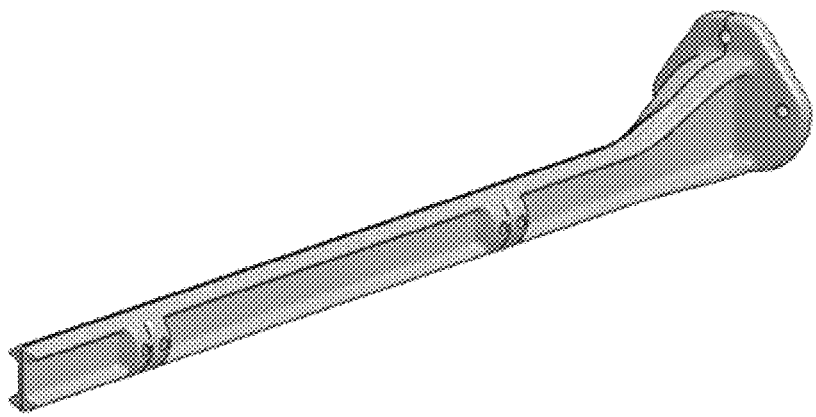
FIG. 49 shows an embodiment of a supporting rod of the present invention.
Figure 50:
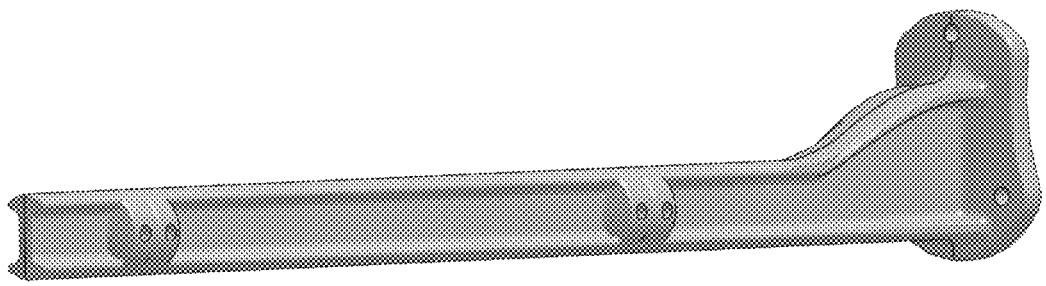
FIG. 50 shows an embodiment of a supporting rod of the present invention.
Figure 51:
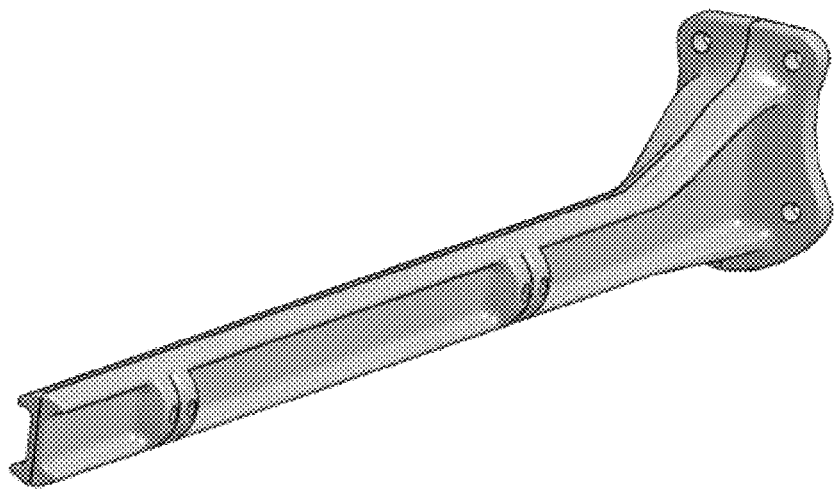
FIG. 51 shows an embodiment of a supporting rod of the present invention.
Figure 52:
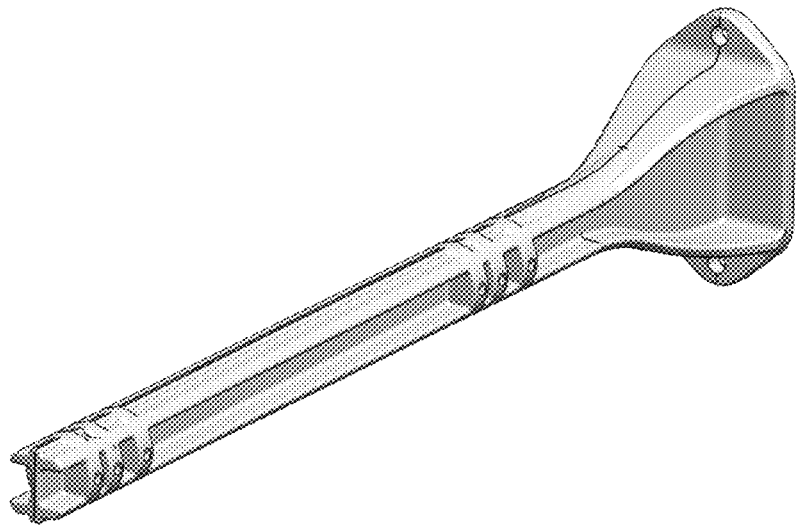
FIG. 52 shows an embodiment of a supporting rod of the present invention.
Figure 53:
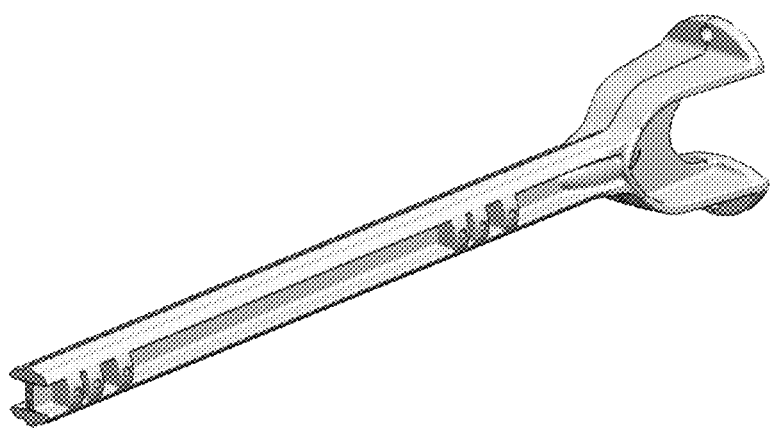
FIG. 53 shows an embodiment of a supporting rod of the present invention.
Figure 54:
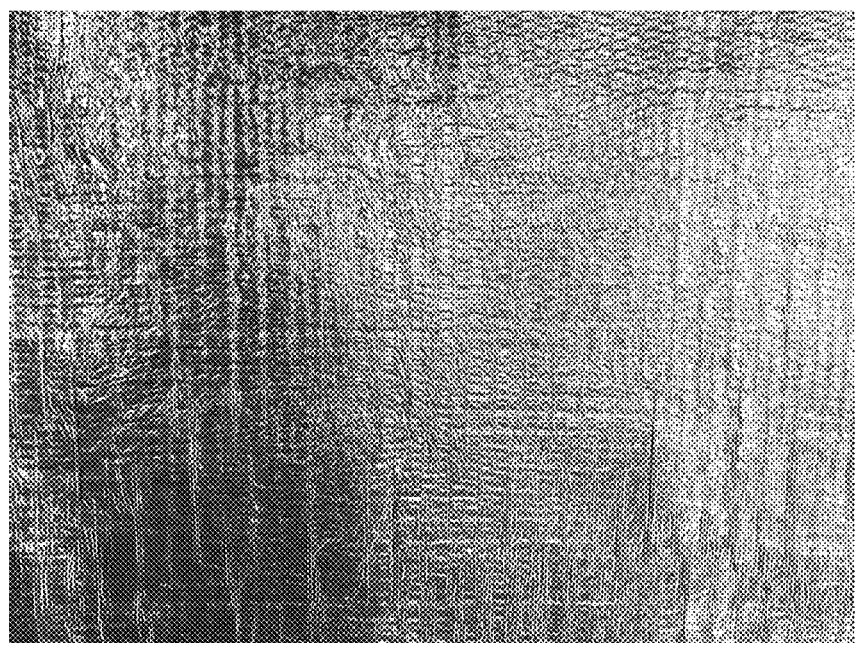
FIG. 54 shows the raw material of an embodiment of the present invention, showing a combination of resin and long fibers.
Figure 55:
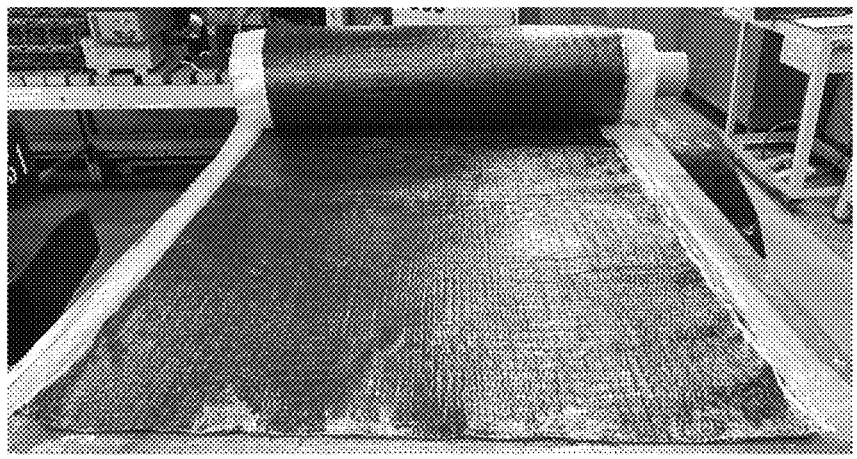
FIG. 55 shows the raw material of an embodiment of the present invention, showing a combination of resin and long fibers.
Figure 56:
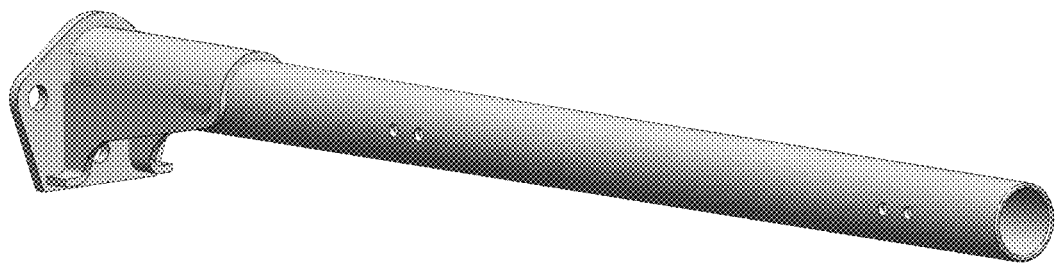
FIG. 56 shows a supporting rod of the prior art.

For these tests, the composite solution for the supporting rod must not have failures due to a creep mechanism in the loads and temperatures to which the component is exposed. For this, a test device was assembled as illustrated in FIG. 33 and in the photograph of FIG. 34, with six supporting rods in composite statically loaded with four samples weighing 120 kgf and two samples weighing 80 kgf. The components were tested at different temperatures from 45° C. to 100° C. The temperature selected for each experiment remained constant throughout the test, for ten days, this being measured in the component. Every test was started with new samples. At the end of the test, the parts that did not present failures were subjected to static testing and the load and deformation measured until complete failure. Every 24 hours, temperature and displacement were recorded. By the end of the ten days, the maximum displacement did not exceed the predetermined limit range and the maximum breaking load of the components was statistically equal to the parts that did not undergo the experiment at different temperatures.

For this test, 18 supporting rods were used in composites, supports with varying number of holes, means of attaching weights to the supporting rod, static test bench for creep, climatic chamber, pyrometer, temperature controller (redundancy) means of measuring length and weights.

Example 4—Resistance Test to Validation Parameters Used for the Complete Road Implement Set The purpose of this test was to prove that the composite solution for the supporting rod is capable of supporting validation parameters used for the complete set of a road implement (between 7000 and 15000 km on an off-road track). For this purpose, nine complete sets of the composite solution and four complete sets of the prior art were assembled in a road implement and a commercial vehicle moved it between 7000 and 15000 km on off-road track. Every 24 hours the nucleation and/or propagation of cracks was inspected, where after a period of days the state of the parts was recorded. By the end of the 7000 to 15000 km, the samples were statistically equal in mechanical properties when compared to the properties of step 1 of the static test and did not show cracks.

It was used in this test a semi-trailer, 9 composite sets, drilling template and equipment for instrumentation and data acquisition.

Example 5—Structural Performance Test

This test was performed to show that the composite supporting rod has a structural performance capable of exceeding 800,000 to 3,000,000 km with six sigma (6δ) of reliability. This test was performed in an embodiment in which the rod supports a fender and wings. For this, the complete solution (with fender and wings) is exposed to vibration on a vertical vibrating bench, using a calibrated MTS system with a track signal (off-road and chops) amplified between 0.5 to 3×. A minimum of 16 sets (32 parts in composite) were exhibited, two sets of prior art metallic parts from the factory for new attachments (4 parts), two sets of prior art metallic spare parts (4 parts) and four sets of prior art metallic parts not belonging to the previous two groups (8 parts), four fender and four wings, to the equivalent damage of 800,000 to 3,000,000 km. By the end of the test, the samples were exposed to quasi-static test until failure. The time of exposure to vibration, nucleation and crack propagation were measured, as well as accelerations at the damping base and at the element tip, as well as the deformation levels in the probable failure region in two sets (4 parts) as a minimum.

An MTS actuator, bench with 1 degree of freedom, supporting rod test base, six tri-axial accelerometers, 2 gauges for composites and hulk bolt assembly tool were also used so that the samples do not present structural failure when exposed to equivalent damage between 800,000 to 3,000,000 km (between 0 to 70% asphalt and 0 to 70% off-road, with 0 to 70% of each sign with the road implement loaded and 0 to 70% empty for each of the two types of pavements) and maximum load result in static test, with reliability of six sigma (6δ). Thus, it was possible to observe the structural performance of the tested components.

Example 6—Mechanical and Visual Degradation Test Due to the Effects of the Weather Present in the Life of the Supporting Rod This test was carried out to test whether the composite solution does not present mechanical and visual degradation caused by the weather present in the working life of the supporting rod. For this, the samples were exposed to possible environments to be found when using the product (water, acid detergent, alkaline detergent and Diesel) and the modifications of the mechanical properties and surface appearance were evaluated. The test consists of fully immersing (in the range of 60 to 300 seconds+/−between 2 to 25 seconds) specimens (CP) in specific media (without dilution) every 24 hours for a period between 50 to 90 days. Between 7 and 20 days short beam tests were performed on three samples of each medium. Short beam tests were performed on five samples (without exposure to media) for control, following the good practices of the standards.

To measure degradation, the mass variation every 24 hours and the mechanical property (short beam test) of three samples between 7 to 20 days, the mass, density and dimensional data were recorded in graphs. 65 CPs were used for short beam in SMC using process parameters equal to those employed in the construction of the supporting rods, precision scale, equipment for short beam realization, hood, surface for placing samples, tweezers for handling samples and PPE.

Thus, it is not desired that the mechanical performance presents statistical variation between samples for any medium tested, also requiring visual approval. The results were observed and considered in the present invention.

Example 7—UV Resistance Test

This test was performed to analyze whether the composite solution would present mechanical and visual degradation by the action of sunlight. The test was carried out in accordance with the appropriate ISO standard. For measurement, the mass variation every 24 hours and mechanical property (short beam test) in three samples between 7 to 20 days. Samples were monitored prior to exposure to the medium. Mechanical performance could not show statistical variation between samples for any medium tested and the result was highly satisfactory.

Example 8—Mechanical and Physical Featuring Test

The mechanical feature of the material used was used as a means of quality control evaluating the impact of changes or variations in the material and/or supplier changes could be controlled through these tests at a first level. It was performed to enter refined data into the assessment model. For this, the material was tested in the following regulations, following the established process parameters: tensile test, compression test, short beam test, DMA test, simplified fiber volume, density and fatigue (3 stress levels) at low temperature (between −20 to 20° C.). Then, the mechanical and physical properties were measured according to specific regulations, indicated in Table 3 below. The results found could not vary between 0 to 30% in relation to the data found in the datasheets of each material.

For this, three plates with different thicknesses of material were used, a press and a mold. Table 3 shows the mechanical tests performed.

TABLE 3

Mechanical tests

| Test | Property | Rules | Measures | Qt |
|---|---|---|---|---|
| Tension | Elastic modulus, tensile strength, Poisson's coefficient, maximum deformation in traction | ASTM D3039 | 250 mm × 25 mm × 2.5 mm | 7 |
| Compression | Compressive strength, maximum deformation in compression | ASTM D6641 | 140 mm × 13 mm × 1.6 mm | 7 |
| In-plane shear | Shear modulus, shear strength | ASTM D5379/ 7078 | 250 mm × 25 mm × 2.5 mm | 7 |
| Short Beam Shear | Short Beam Shear Strength | ASTM D2344 | 30 mm × 12 mm × 6 mm | 7 |

Example 9—Manufacturing Error Test

This test was performed to verify that parts manufactured outside the standard manufacturing procedure have defects that can be verified on the part visually and/or with the use of simple equipment (e.g., scale, caliper, etc.). For verification, two parts were processed with the following parameters out of specification; other parameters must be kept within the specified:
1) Mold overheating between 0 to 40% to maximum limit;
2) Mold underheating between 0 to 40% to maximum limit;
3) Mold closed time between 0 to 40% less than the established minimum limit;
4) Closing speed between 0 to 40% higher than the stipulated maximum limit;
5) SMC load between 0 to 40% lower than specified;
6) SMC load between 0 to 40% higher than specified; and
7) SMC load positioned out of standard.

The mechanical properties and physics were measured according to specific regulations in Table 3. The results found could not vary between 0 to 30% in relation to the data found in the datasheets of each material.

Example 10—Burr Impact Test

This test was performed in an embodiment in which the rod supports a fender to show that the presence of burr from vertical closing (process and quality gain) does not affect the life and/or performance of the fender. For this, four parts in design 1 (prototype tool) were used to machine a recess simulating the presence of burr (copying dimensions) and expose the assembly assembled to the rotational vibratory bench (calibrated between 0 to 1800 RPM) for a period between 200 to 500 hours. The nucleation and propagation of cracks in the fender is then measured. It was then verified if the fender withstood the test, 200 to 500 hours, without crack propagation occurring in the anchorage regions. For this, four prototype model supporting rods, two fender, two mudguards, fastener kit and rotating bench were used. Material is then removed from the circular section leaving a burr between 0 to 10 mm in width with a depth of between 0 to 6 mm.

Example 11—Rod Validation—Laboratory Static Validation

To validate the rod of the present invention, it was initially subjected to a static validation at room temperature in the laboratory, where the rod is subjected to a static load between 30 kgf and 150 kgf, exposed to an ambient temperature, between 15° C. and 30° C. Its deformation is measured and mechanical failure due to traction in the fibers is expected. As the failure occurred as desired and estimated, as illustrated in FIG. 9, the rod of the present invention was approved in this first validation step.

Subsequently, the rod is subjected to static validation under high temperature. The rod undergoes static loading between 30 kgf and 150 kgf, exposed to a temperature between 50° C. and 120° C. Its deformation is measured and a mechanical failure due to tension in the fibers or degradation of the polymeric matrix is expected. As the failure occurred as desired and estimated, the rod of the present invention passed this first validation step.

Then, the rod is subjected to a dynamic validation in the laboratory. The rod is subjected to acceleration and deformation parameters in various track events, such as asphalt in good condition, unpaved roads, special durability tracks, among others. These parameters are replicated and/or modified in an actuator-controlled vibratory bench, which replicates the damage level typical of standard tracks. Complementary validation features such as moisture and dirt can be added to the bench durability test to expose the element to realistic operating conditions.

Finally, the rod is subjected to dynamic validation on track. Based on the road information collected on public roads and roads for testing, a circulation route is generated promoting the same damage experienced during its useful life in the component, but in an accelerated way.

Since the rod of the present invention has passed all the above tests and validations, the efficiency and satisfactory quality of it is evident, as are the various advantages of the present invention and the mechanical and industrial qualities of the proposed system.

Those skilled in the art will appreciate the knowledge presented herein and may reproduce the invention in the presented modalities and in other variants and alternatives, covered by the scope of the following claims.

What is claimed is:

1. A supporting rod of a vehicle component for commercial vehicles, comprising at least a combination of cured resin and long fiber, wherein said long fiber corresponds to a range of 20% to 85% by mass of the rod, and wherein the supporting rod further comprises:
  a) a vehicle-associated damping base (20), provided with an upper bow (21) and a lower bow (21), a central vertical region (22) delimited by the bows (21) and at least one association component (23) with non-permanent/removable fastening elements for association with the vehicle; and
  b) an extension (30) extending from the damping base (20), comprising a vertical portion (31) and two horizontal portions (32), being one above the vertical portion (31) and the other below the vertical portion (31), wherein the width of each horizontal portion (32) is greater than the width of the vertical portion (31), said extension (30) comprising in its vertical portion (31) a plurality of protrusions (33) of association with non-permanent/removable fastening elements of association with said vehicle component, said protrusions (33) promoting interchangeability between multiple vehicle component models,
  wherein the width of the damping base (20) is greater than the width of the extension (30).

2. The supporting rod according to claim 1, wherein the combination of cured resin and long fiber comprises a physical property selected from the group consisting of:
   a) elastic modulus for bending force in a range of 5 GPa to 50 GPa;
   b) elastic modulus for tension force in a range of 5 GPa to 50 GPa;
   c) loss factor in a range of 0.01 to 0.35; and
   d) combinations thereof.

3. The supporting rod according to claim 1, wherein the combination of resin and long fiber comprises a physical property selected from the group consisting of:
   a) minimum flexural strength of 300 MPa;
   b) minimum flexural modulus of 15 GPa;
   c) minimum tensile strength of 150 MPa;
   d) minimum tensile modulus of 18 GPa;
   e) minimum impact strength of 1400 J/m; and
   f) combinations thereof.

4. A supporting rod of a vehicle component for commercial vehicles, comprising at least a combination of cured resin and long fibers, wherein said long fiber corresponds to a range of 20% to 85% by mass of the rod, wherein the supporting rod comprises a failure region (1), which is predefined and incomplete, in which: i) only a portion of the long fiber is broken in a cross section of the failure region (1); or ii) partial degradation of the resin in a failure region (1); or iii) both, wherein the failure region (1) is a region with less of the long fiber and/or less of the resin than in the rest of the supporting rod.

5. A process for manufacturing a supporting rod of a vehicle component for commercial vehicles, the supporting rod comprising at least a combination of cured resin and long fiber, wherein the process comprises the steps of forming a support rod by pressing the combination of cured resin and long fiber into a mold, curing the resin and demolding the supporting rod, wherein the mold comprises geometry to form the supporting rod, the supporting rod comprising:
   a) a vehicle-associated damping base (20), provided with an upper bow (21) and a lower bow (21), a central vertical region (22) delimited by the bows (21) and at least one association component (23) with non-permanent/removable fastening elements for association with the vehicle; and
   b) an extension (30) extending from the damping base (20), comprising a vertical portion (31) and two horizontal portions (32), being one above the vertical portion (31) and the other below the vertical portion (31), wherein the width of each horizontal portion (32) is greater than the width of the vertical portion (31), said extension (30) comprising in its vertical portion (31) a plurality of protrusions (33) of association with non-permanent/removable fastening elements of association with said vehicle component, said protrusions (33) promoting interchangeability between multiple vehicle component models,
   wherein the width of the damping base (20) is greater than the width of the extension (30).

* * * * *